US012585077B2

(12) United States Patent
Ebrahimi et al.

(10) Patent No.: US 12,585,077 B2
(45) Date of Patent: Mar. 24, 2026

(54) FIBER OPTIC HOUSING AND CLIP

(71) Applicant: AFL Telecommunications LLC, Duncan, SC (US)

(72) Inventors: Vahid Ebrahimi, Simpsonville, SC (US); Artur Bureacov, Tacoma, WA (US); Sean Pons, Kent, WA (US)

(73) Assignee: AFL Telecommunications LLC, Duncan, SC (US)

( * ) Notice: Subject to any disclaimer, the term of this patent is extended or adjusted under 35 U.S.C. 154(b) by 323 days.

(21) Appl. No.: 18/273,846

(22) PCT Filed: Jan. 12, 2022

(86) PCT No.: PCT/US2022/012077
§ 371 (c)(1),
(2) Date: Jul. 24, 2023

(87) PCT Pub. No.: WO2022/164632
PCT Pub. Date: Aug. 4, 2022

(65) Prior Publication Data
US 2025/0076602 A1 Mar. 6, 2025

Related U.S. Application Data

(60) Provisional application No. 63/179,861, filed on Apr. 26, 2021, provisional application No. 63/147,136, (Continued)

(51) Int. Cl.
*G02B 6/44* (2006.01)

(52) U.S. Cl.
CPC ......... *G02B 6/4471* (2013.01); *G02B 6/4454* (2013.01); *G02B 6/44785* (2023.05); *G02B 6/4442* (2013.01); *G02B 6/4455* (2013.01)

(58) Field of Classification Search
CPC .. G02B 6/4442; G02B 6/4454; G02B 6/4455; G02B 6/4471; G02B 6/44785
See application file for complete search history.

(56) References Cited

U.S. PATENT DOCUMENTS

| | | | |
|---|---|---|---|
| 5,395,101 A | 3/1995 | Takimoto et al. | |
| 5,870,519 A | 2/1999 | Jenkins et al. | |
| | (Continued) | | |

FOREIGN PATENT DOCUMENTS

| | | |
|---|---|---|
| EP | 1531351 A3 | 8/2005 |
| WO | WO9605527 A1 | 2/1996 |
| | (Continued) | |

OTHER PUBLICATIONS

International Search Report Corresponding with Application No. PCT/US2022/012077 on Apr. 20, 2022 (2 pages).

*Primary Examiner* — Ryan A Lepisto
(74) *Attorney, Agent, or Firm* — Dority & Manning, P.A.

(57) ABSTRACT

A fiber optic housing including a receptacle and a retainer clip fixable to the receptacle at one or more of a plurality of apertures. The receptacle includes a plurality of sidewalls extending along a longitudinal axis, a base wall extending from the plurality of sidewalls, and an end wall extending along a lateral axis between the plurality of sidewalls. The retainer clip forms a pathway extending along the longitudinal axis between a first clip end and a second clip end. The first clip end and the second clip end form openings into the pathway. A cable is extendable into the receptacle through the pathway formed at the retainer clip.

20 Claims, 34 Drawing Sheets

Related U.S. Application Data filed on Feb. 8, 2021, provisional application No. 63/142,337, filed on Jan. 27, 2021.

(56) References Cited

U.S. PATENT DOCUMENTS

| | | | |
|---|---|---|---|
| 6,081,644 | A | 6/2000 | Stateczny et al. |
| 6,135,398 | A | 10/2000 | Quesnel |
| 6,275,642 | B1 | 8/2001 | Pouvez et al. |
| 6,507,691 | B1 * | 1/2003 | Hunsinger ........... G02B 6/4454 |
| | | | 385/136 |
| 6,594,436 | B2 | 7/2003 | Sun et al. |
| 6,601,997 | B2 | 8/2003 | Ngo |
| 6,764,225 | B2 | 7/2004 | Ngo et al. |
| 6,810,191 | B2 | 10/2004 | Ferris et al. |
| 7,141,738 | B2 | 11/2006 | Marsac et al. |
| 7,326,863 | B2 | 2/2008 | Herzog |
| 7,330,629 | B2 | 2/2008 | Cooke et al. |
| 7,418,186 | B1 * | 8/2008 | Grubish ............... G02B 6/4477 |
| | | | 385/137 |
| 7,438,485 | B2 | 10/2008 | Tabata et al. |
| 7,546,020 | B2 | 6/2009 | Honma |
| 7,613,376 | B2 * | 11/2009 | Wright ................. G02B 6/4478 |
| | | | 385/134 |
| 7,615,710 | B2 | 11/2009 | Sayres |
| 8,254,743 | B2 | 8/2012 | Sato |
| 8,500,073 | B2 | 8/2013 | Quesnel |
| 8,534,928 | B2 | 9/2013 | Cooke et al. |
| 8,559,785 | B2 | 10/2013 | Barlowe et al. |
| 8,710,369 | B2 | 4/2014 | Krietzman et al. |
| 8,759,682 | B2 | 6/2014 | Devouge |
| 8,770,532 | B2 | 7/2014 | Ruiz et al. |
| 8,805,153 | B2 | 8/2014 | Rudenick et al. |
| 8,841,553 | B2 | 9/2014 | Dower et al. |
| 8,842,960 | B2 | 9/2014 | Berglund et al. |
| 8,858,092 | B2 | 10/2014 | Donaldson et al. |
| 8,913,864 | B2 | 12/2014 | Reeve |
| 8,939,660 | B2 | 1/2015 | Sato |
| 9,042,698 | B2 | 5/2015 | Klimowych et al. |
| 9,052,487 | B2 | 6/2015 | Sato |
| 9,059,578 | B2 | 6/2015 | Sokolowski et al. |
| 9,146,353 | B2 | 9/2015 | Kawanishi |
| 9,270,097 | B2 | 2/2016 | Krietzman et al. |
| 9,316,804 | B2 | 4/2016 | Badura et al. |
| 9,360,648 | B2 | 6/2016 | Rudenick et al. |
| 9,377,132 | B2 | 6/2016 | Bishop et al. |
| 9,488,781 | B2 | 11/2016 | Takayanagi et al. |
| 9,494,760 | B2 * | 11/2016 | Simmons ........... G02B 6/44526 |
| 9,500,832 | B2 | 11/2016 | Bible et al. |
| 9,606,321 | B2 | 3/2017 | Nadeau et al. |
| 9,780,548 | B1 | 10/2017 | Kranz |
| 9,829,119 | B2 | 11/2017 | Desjardins et al. |
| 10,107,964 | B1 | 10/2018 | Zhao |
| 10,114,188 | B2 | 10/2018 | Miller |
| 10,551,564 | B2 | 2/2020 | Kurino et al. |
| 10,746,927 | B2 | 8/2020 | Akiyama et al. |
| 10,761,285 | B2 | 9/2020 | Courchaine et al. |
| 11,194,112 | B2 * | 12/2021 | Collart ............... G02B 6/44775 |
| 2010/0284661 | A1 * | 11/2010 | Bran de Leon ...... G02B 6/4454 |
| | | | 385/137 |
| 2011/0280537 | A1 | 11/2011 | Cowen et al. |
| 2012/0279749 | A1 | 11/2012 | Badura et al. |
| 2014/0133822 | A1 | 5/2014 | De Los Santos Campos et al. |
| 2015/0301287 | A1 | 10/2015 | Zhao |
| 2018/0284353 | A1 | 10/2018 | Zhac |
| 2019/0115738 | A1 | 4/2019 | Quesnel |
| 2020/0041042 | A1 | 2/2020 | Vaccaro et al. |
| 2020/0208756 | A1 | 7/2020 | Vaccaro et al. |
| 2022/0120975 | A1 * | 4/2022 | Geens ............... G02B 6/44465 |
| 2022/0196959 | A1 * | 6/2022 | Cams .................. G02B 6/4477 |

FOREIGN PATENT DOCUMENTS

| | | |
|---|---|---|
| WO | WO2008141142 A2 | 11/2008 |
| WO | WO2018159240 A1 | 9/2018 |
| WO | WO2019173199 A1 | 9/2019 |
| WO | WO2019197665 A3 | 10/2019 |
| WO | WO2019212366 A1 | 11/2019 |
| WO | WO2019222148 A2 | 11/2019 |
| WO | WO2020041101 A1 | 2/2020 |
| WO | WO2020239827 A1 | 12/2020 |

* cited by examiner 421C    433    400B
430
410A
426
410B 421    433
421A
421B
430    422B
422B
422A    422D
426    422C
422E 433
421A
422
410
426    422

433
421A
426

FIBER OPTIC HOUSING AND CLIP

This application claims the benefit of priority to patent application PCT/US2022012077, filed Jan. 12, 2022, which claims the benefit of priority to U.S. provisional application No. 63/179,861, filed Apr. 26, 2021, U.S. provisional application No. 63/147,136, filed Feb. 8, 2021, and U.S. provisional application No. 63/142,337, filed Jan. 27, 2021, the disclosures of which are incorporated by reference in their entireties.

FIELD

Field

The present disclosure relates generally to housings, such as for fiber optic cable connections, and more specifically to improved organizer assemblies for fiber optic housings.

BACKGROUND

Certain housings are utilized to facilitate the connection of transmission cables such as fiber optic cables. Such housings may include "butt" closures, "domed" closures, or enclosures for fiber optic cable connections. The cables enter the housing through a sealed base, and connection of the cable elements occurs within the housing. In the case of fiber optic cables, spliced-together optical fibers are held within the housing.

Many fiber organizer assemblies utilized in known housings generally have edges that can cause buffer tubes to kink if they are pulled over these edges. Further, in many cases, trays of the organizer assemblies must be held in the vertical or up position while other trays are being populated with fiber and while splicing is being done. Still further, splice modules utilized in such trays provide limited flexibility with respect to the types of splices and/or other components that can be held therein.

Structures and methods for preparing trays for splicing and storing trays and other internal surfaces of housings may provide some degree of cable and fiber organization but fail to mitigate, or inadequately mitigate, damage related to rubs, abrasion, compression, or tension at the cables. Known methods and structures may utilize tie wraps, rolled foam, or hard plastic tubes, which may lead to undesired wear or rubbing at the cable. The outcome of such methods and structures may be dependent on the user, which allows for inconsistent results among users.

As such, methods and structures that reduce or mitigate wear, or furthermore reduce preparation time, of trays for splicing and cable routing would be advantageous. Furthermore, methods and structure that reduce inconsistency between users, or improve consistency between users, would be advantageous. Still further, improved organizer structures for use with housings would be advantageous. Specifically, organizer structures which address one of more of the above-stated deficiencies would be advantageous.

BRIEF DESCRIPTION

Aspects and advantages of the invention will be set forth in part in the following description, or may be obvious from the description, or may be learned through practice of the invention.

An aspect of the present disclosure are directed to a fiber optic housing, the housing including a receptacle including a plurality of sidewalls extending along a longitudinal axis between a first end and a second end, wherein the first end forms an open end such that a cable is extendable to or from an interior of the receptacle; a base wall extending from the plurality of sidewalls along the longitudinal axis and a lateral axis, wherein the base wall forms a plurality of apertures at the first end; an end wall extending along the lateral axis between the plurality of sidewalls, wherein the receptacle forms the interior between the plurality of sidewalls, the base wall, and the end wall; a retainer clip fixable to the receptacle at one or more of the plurality of apertures, the retainer clip forming a pathway extending along the longitudinal axis between a first clip end and a second clip end, wherein the first clip end and the second clip end form openings into the pathway, wherein the cable is extendable into the receptacle through the pathway.

Another aspect of the present disclosure is directed to a fiber optic housing, the housing including a base insertable at least partially into the interior of the housing; a basket extending along a longitudinal axis between a first end and a second end, wherein the first end forms an open end such that one or more cables extends into the interior of the housing along the longitudinal axis, and the second end forms a closed end; a bracket assembly extending along a transverse axis from the basket, the bracket assembly including a plurality of hinge assemblies along the transverse axis; a fiber optic organizing system rotatably and removably connectable to the bracket assembly between the hinge assemblies, the organizing system extending along the longitudinal axis between the first end and the second end and extending along a lateral axis between a first sidewall and a second sidewall, the organizing system including a base wall extending along the longitudinal axis and the lateral axis, the base wall forming a plurality of apertures, wherein an interior is formed between the first sidewall, the second sidewall, and the base wall; a connector shaft extending from the first end along the longitudinal axis, the connector shaft connecting the organizing system and the base together; and a retainer clip fixable to the fiber optic organizing system at the plurality of apertures, the retainer clip forming a pathway extending along the longitudinal axis between a first clip end and a second clip end, wherein the first clip end and the second clip end form openings into the pathway, wherein the cable is extendable into the organizing system through the pathway.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF FIGURES

A full and enabling disclosure of the present invention, including the best mode thereof, directed to one of ordinary skill in the art, is set forth in the specification, which makes reference to the appended figures, in which.

DETAILED DESCRIPTION

Figure 1:
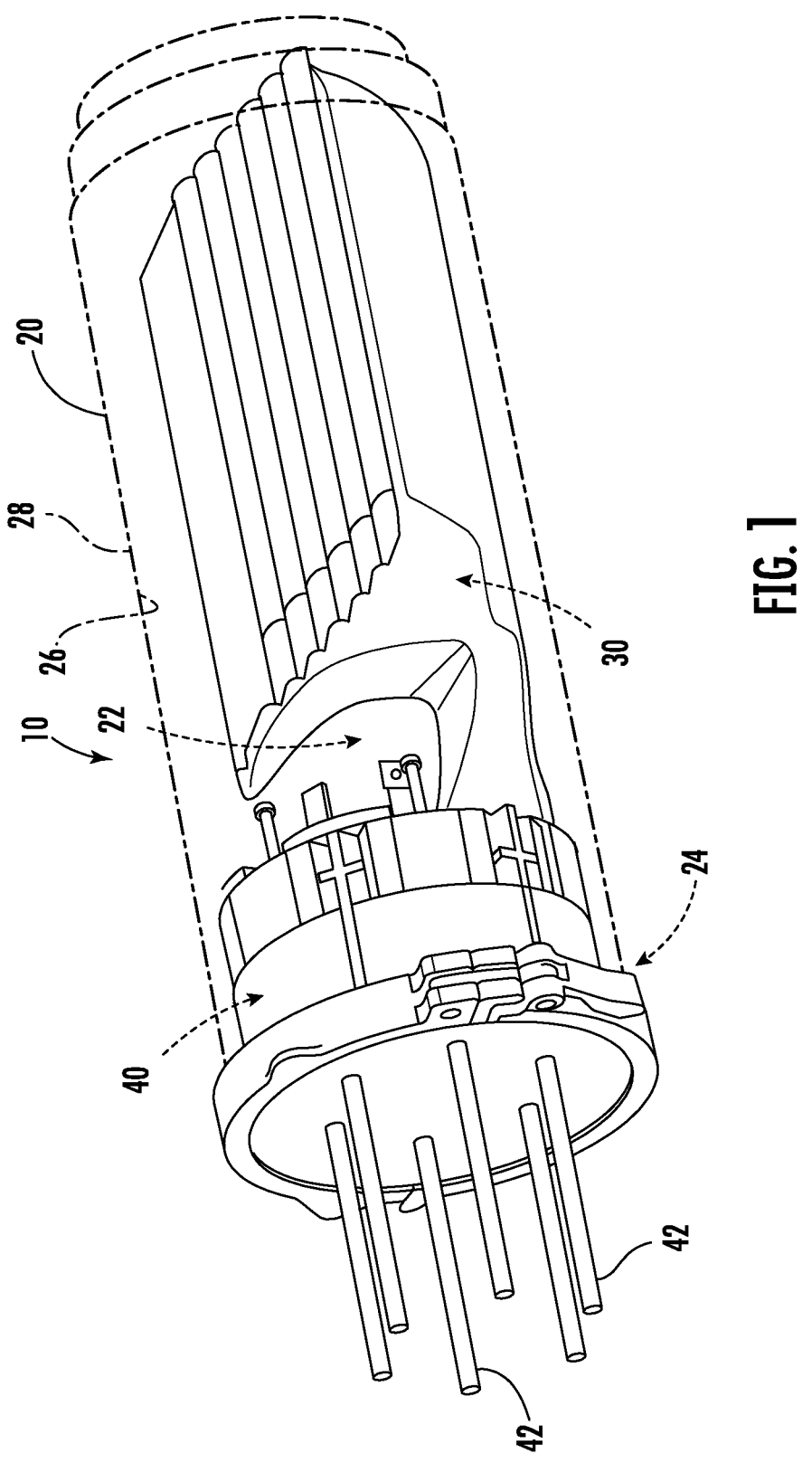
FIG. 1 is a perspective view of a housing in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the figures, embodiments of housings and organizer assemblies in accordance with the present disclosure are provided. Housings in accordance with the present disclosure, and in particular the organizer assemblies and deep tray organizer assemblies, thereof, may advantageously provide improved routing features which reduce kinking and attenuation risks. Certain embodiments of housing 10 may form a closure, such as a butt closure or domed closure, for fiber optic cable connections. The closure may particularly be configured for outside environments and placement at utility posts, overhanging conduits, outside closets, etc. Still certain embodiments of the housing provided herein may form an enclosure, such as utilized for indoor environments. Receptacles 500, such as organizer baskets 110, 150, or trays 200, 300 thereof including retainer clips 400 or additional components in accordance with the present disclosure may advantageously provide improved features for securing and positioning cables 42 at and through organizer trays and baskets in a variety of positions. Such structures and assemblies may accordingly advantageously allow efficient and effective fiber-populating, fiber splicing, improve cable routing consistency via relatively simple, re-useable structures, eliminating the use or need for tie-wraps, or mitigate undesired rubbing, wearing, compression, or tension at the cable.

Embodiments provided herein include a retainer clip through which a cable, such as a fiber optic cable, or fibers thereof, can consistently route through a housing while mitigating undesired wear at the cable. Embodiments may include a removeable insert or flexible liner, such as an expandable mesh sleeve, surrounding a portion of the cable extended through the retainer clip. The retainer clip and insert may cover exposed slacks stored in the housing, without requiring additional securing structures (e.g., tie wraps). Embodiments provided herein may provide strain relief to the cable, or fibers thereof, going to splice trays.

Referring now to FIG. 1, a housing 10 in accordance with the present disclosure includes a cover 20. Cover 20 is generally a domed cover which defines an interior 22 and an opening 24 which provides access to the interior 22. Cover 20 may include an inner surface 26 which defines the interior 22 and an opposing outer surface 28 which is exposed to the external environment.

An organizer assembly 30 may be insertable into (and thus disposed within) the interior 22, such as along a longitudinal axis of the housing 10. Organizer assembly 30 may include one or more organizer trays 200 and/or other suitable components for facilitating transmission component connections. For example, in the case of use with fiber optic cables, splices between optical fibers thereof may be housed in the various splice trays.

A base 40 may be insertable at least partially into (and thus disposed at least partially within) the interior 22. In some embodiments, organizer assembly 30 may be connected to the base 40, such that insertion of the base 40 causes insertion of the tray assembly 30 into the interior 22. Cables 42 may be inserted through the base 40 into the interior 22, and connection between transmission elements thereof (such as optical fibers) may be made within the interior 22, such as in the organizer trays 200 of the organizer assembly 30.

FIGS. 2 through 14 illustrate various embodiments of organizer assemblies 30 and components thereof in accordance with embodiments of the present disclosure. A mutually orthogonal coordinate system may be defined for organizer assemblies 30 in accordance with the present disclosure, and may include a mutually orthogonal longitudinal axis 102, lateral axis 104, and transverse axis 106. Extensions along each respective axis may be described as the longitudinal direction 102, the lateral direction 104, and the transverse direction 106, respectively.

Figure 2:
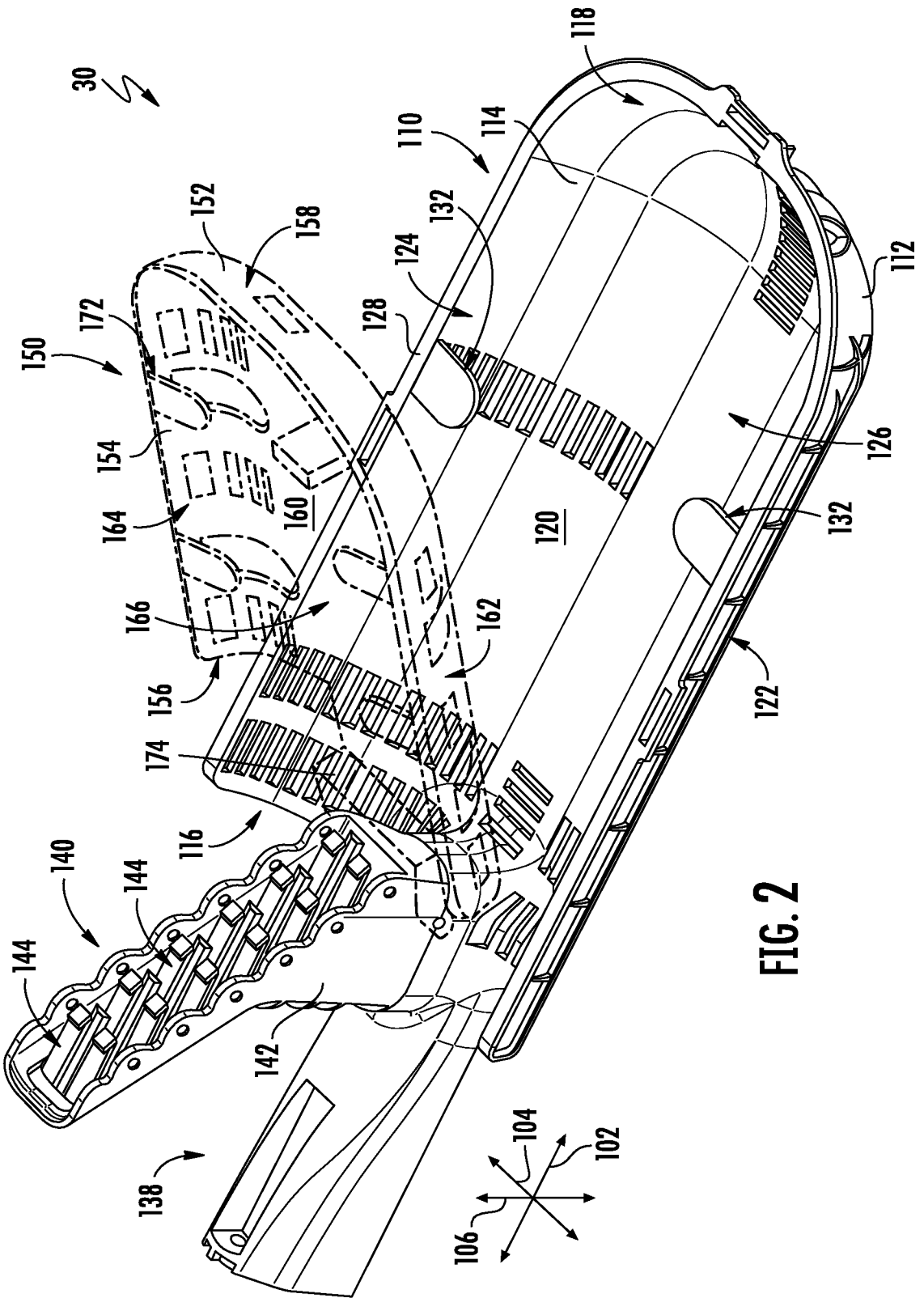
FIG. 2 is a perspective view of an organizer assembly, with a secondary basket connected thereon, in accordance with embodiments of the present disclosure.
Figure 3:
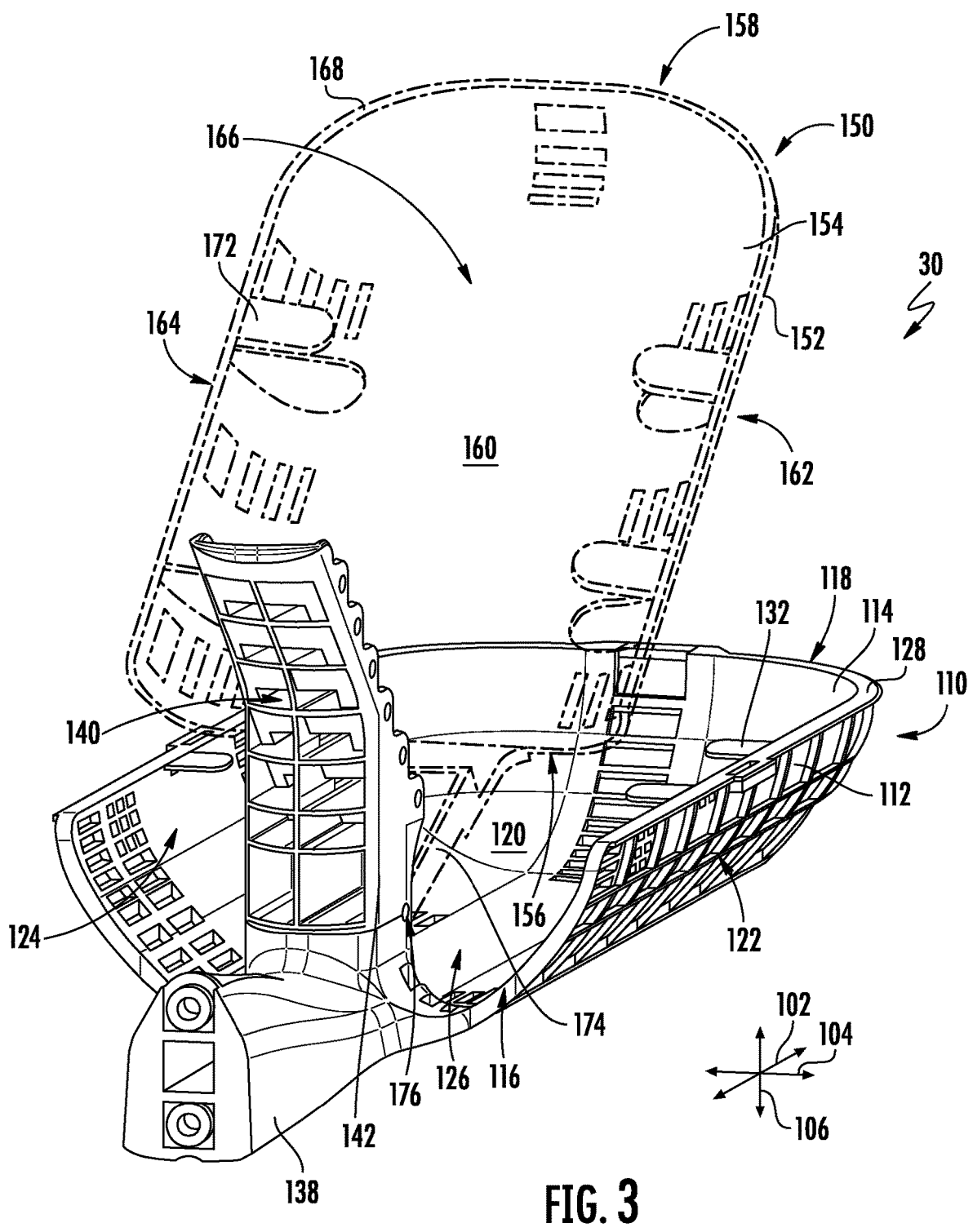
FIG. 3 is a rear perspective view of an organizer assembly, with a secondary basket connected thereon, in accordance with embodiments of the present disclosure.
Figure 4:
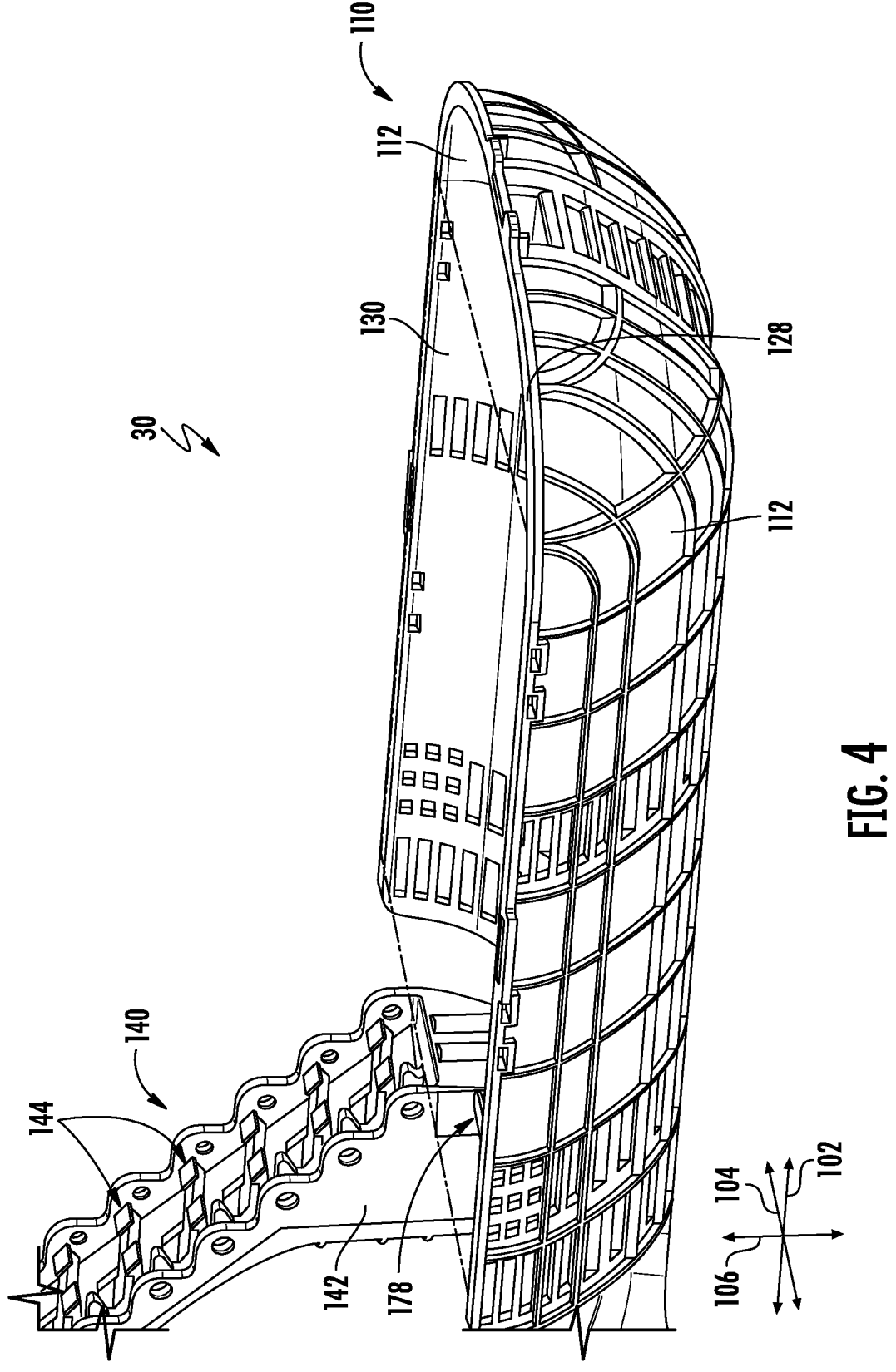
FIG. 4 is a perspective view of an organizer assembly, with a cover plate provided thereon, in accordance with embodiments of the present disclosure.

Referring in particular to FIGS. 2 through 4, organizer assemblies 30 in accordance with the present disclosure may include a primary basket 110. The primary basket 110 generally forms at least a portion of the base exterior of the organizer assembly 30, and includes an exterior surface 112 and an interior surface 114. The primary basket 110 may extend along the longitudinal direction 102 between a first end 116 and a second end 118. The first end 116 may be an open end, as shown, such that cables 42 or transmission elements thereof being directed along and parallel to the longitudinal direction 102 can enter or exit an interior 120 of the primary basket 110 through the first end 116. The second end 118 may be a closed end, as shown, such that cables 42 or transmission elements thereof being directed along and parallel to the longitudinal direction 102 cannot enter an interior 120 of the primary basket 110 through the second end 118, and instead encounter a surface of the primary basket 110.

The primary basket 110 may further extend along the lateral direction 104 between a first side 122 and a second side 124, both of which may be closed (as discussed above with respect to second end 118). In exemplary embodiments, a length between the first end 116 and second end 118 is greater than a length between the first side 122 and the second side 124. Further, in exemplary embodiments, transitions between the closed second end 118 portion and a base portion 126, the closed first side portion 122 and the base portion 126, the closed second side portion 124 and the base portion 126, the closed second end 118 portion and closed first side portion 122, and/or the closed second end 118 portion and closed second side portion 124 are curved.

Basket 110 may generally be utilized to house excess cables 42 and/or transmission elements thereof as the cables 42 and/or transmission elements thereof are routed through the housing 10 and organizer assembly 30 thereof.

Primary basket 110 may further include an upper peripheral lip 128, which may extend between the first end 116 and second end 118, such as on the sides 122, 124, and may further extend between the sides 122, 124, such as along the closed second end 118. For example, the lip 128 may extend along an upper edge (along the traverse axis 106) of the primary basket 110, such as along the sides 122, 124 and second end 118.

In some embodiments, as illustrated in FIG. 4, a cover plate 130 may be provided. Cover plate 130 may be removably positioned on the basket 110, such as on the lip 128 thereof. Hook-and-loop fasteners or other suitable fastening apparatus may be utilized to removably fasten the cover plate 130 to the basket 110. Cover plate 130 may protect and help to secure portions of cables 42 and transmission elements thereof which are disposed in and routed through the interior 120 of basket 110.

In some embodiments, basket 110 may further include a plurality of retainer tabs 132, each of which extends from the basket 110 into the interior 120. The tabs 132 may be connected to the basket 110 at the upper edge of the basket 110, such as adjacent the lip 128. Further, in exemplary embodiments, the tabs 132 are removable. In some embodiments, for example, the tabs 132 may be removed when a secondary basket (as discussed herein) is connected. Tabs 132 may generally assist in routing and retaining cables 42 and transmission elements in the interior 120 during assembly, splicing, etc., thereof.

A connector shaft 138 may extend from the first end 116 along the longitudinal direction 102, such that at least a portion of the connector shaft 138 is exterior to the primary basket 110. The connector shaft 138 may connect to the base 40, thus connecting the organizer assembly 30 and base 40 together.

Referring now in particular to FIGS. 2 through 4 and 6 through 8, a bracket assembly 140 may extend along the transverse direction 106 from the primary basket 110, such as at the first end 116. Bracket assembly 140 may include a main body 142 and a plurality of hinge assemblies 144. The hinge assemblies 144 may be spaced apart in a linear array along the transverse direction 106. In exemplary embodiments, the hinge assemblies 144 are stepped along the transverse direction 106. In these embodiments, the linear array of the hinge assemblies 144 is angled relative to the transverse direction 106, rather than being directed along or parallel to the transverse direction 106. At least the portion of the main body 142 which includes the hinge assemblies 144 may also be so angled. Such angle may be between the transverse direction 106 and the longitudinal direction 102, as shown.

As shown in FIGS. 2 and 3, organizer assemblies 30 in accordance with the present disclosure may include a secondary basket 150 which may be rotatably and removably connectable to the bracket assembly 140. FIGS. 2 and 3 illustrate the secondary basket 150 rotatably connected to the bracket assembly 140. In exemplary embodiments, the secondary basket 150 may be connected to the bracket assembly 140 below the plurality of hinge assemblies 144 along the transverse direction 106, such as between the plurality of hinge assemblies 144 (such as the lower-most hinge assembly 144) and the interior surface 114 of the primary basket 110 along the transverse direction 106. The secondary basket 150 may be rotatable between a first position wherein the secondary basket 150 is aligned along the longitudinal direction 102 and a second position wherein the secondary basket 150 is aligned along the transverse direction 106 or at an angle between the longitudinal direction 102 and transverse direction 106 (as shown in FIGS. 2 and 3). In exemplary embodiments, the secondary basket 150 may be removable, such that it can be utilized as needed for cable 42 (and transmission elements thereof) routing and set aside/discarded when not needed.

The secondary basket 150 includes an exterior surface 152 and an interior surface 154. The secondary basket 150 may extend (such as along the longitudinal direction 102 when in the first position) between a first end 156 and a second end 158. The first end 156 may be an open end, as shown, such that cables 42 or transmission elements thereof being directed along and parallel to the longitudinal direction 102 can enter or exit an interior 160 of the secondary basket 150 through the first end 156, when the secondary basket 150 is in the first position. The second end 158 may be a closed end, as shown, such that cables 42 or transmission elements thereof being directed along and parallel to the longitudinal direction 102 cannot enter an interior 160 of the secondary basket 150 through the second end 158, and instead encounter a surface of the primary basket 110, when the secondary basket 150 is in the first position.

The secondary basket 150 may further extend along the lateral direction 104 between a first side portion 162 and a second side portion 164, both of which may be closed (as discussed above with respect to second end 118) and extending from a base portion 166. The base portion 166 extends along the longitudinal axis and the lateral axis. In exemplary embodiments, a length between the first end 156 and second end 158 is greater than a length between the first side 162 and the second side 164. Further, in exemplary embodiments, the secondary basket 150 is curved at transitions from the base portion 166 to end walls at the closed second end 158 (second end portion 158), the closed first side portion 162, the closed second side portion 164, and curved at transitions between the closed second end portion 158 and closed first side portion 162, and/or the closed second end portion 158 and closed second side portion 164.

In exemplary embodiments, the area of the interior 160 may be less than the area of the interior 120, the length between the first end 156 and second end 158 may be less than the length between the first end 116 and second end 118, and/or the length between the first side 162 and second side 164 is less than the length between the first side 122 and second side 124, such that the secondary basket 150 can fit at least partially within the primary basket 110 (such as the interior 120 thereof).

Secondary basket 150 may further include an upper peripheral lip 168, which may extend between the first end 156 and second end 158, such as on the sides 162, 164, and may further extend between the sides 162, 164, such as along the closed second end 158. For example, the lip 168 may extend along an upper edge (along the traverse axis 106) of the secondary basket 150, such as along the sides 162, 164 and second end 158.

In particular embodiments, basket 150 include a plurality of retainer tabs 172, each of which extends from the basket 150 into the interior 160. The tabs 172 may be connected to the basket 150 at the upper edge of the basket 150, such as adjacent the lip 168. Tabs 172 may generally assist in routing and retaining cables 42 and transmission elements in the interior 160 during assembly, splicing, etc., thereof.

One or more connector arms 174 may extend from the first end 156 (such as along the longitudinal direction 102 when the secondary basket 150 is in the first position). The connector arms 174 may be removably connected to the bracket assembly 140, thus rotatably connecting the secondary basket 150 thereto. For example, protrusions 176 provided on the arms 174 may be inserted in depressions 178 defined in the main body 142 to rotatably connect the secondary basket 150 thereto.

Referring again to FIGS. 2 through 4 and 6 through 8, each hinge assembly 144 may include at least one positioning tab 180 and at least one release tab 182. In some embodiments, for example, each hinge assembly 144 may include two positioning tabs 180 and a release tab 182, with the release tab 182 disposed between the positioning tabs 180 along the lateral direction 104. Each positioning tab 180 may be a generally tapered protrusion extending along the transverse direction 106 from the main body 142. Each release tab 182 may extend along the longitudinal direction 102 from the main body 142, and may thus protrude from the main body 142 farther than the positioning tab(s) 180 along the longitudinal direction 102.

Each bracket assembly 144 may further include one or more depressions 184 (which may for example be through-holes) defined in the main body 142.

Referring now to FIGS. 5 through 8 and 12 through 14, organizer assemblies 30 in accordance with the present disclosure may further include one or more organizer trays 200, such as in exemplary embodiments a plurality of organizer trays 200.

Figure 5:
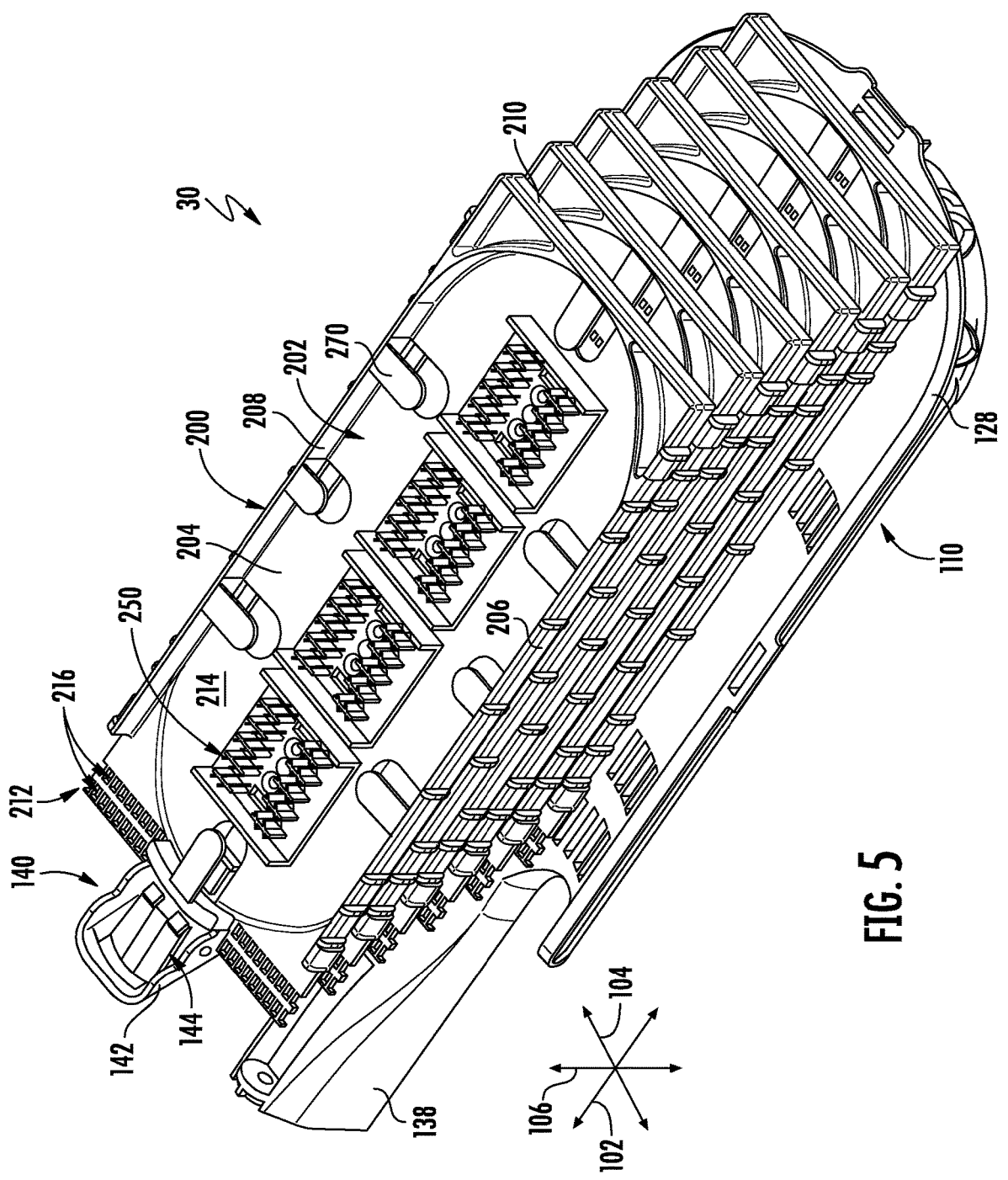
FIG. 5 is a perspective view of an organizer assembly, with a plurality of organizer trays connected thereon in first positions, in accordance with embodiments of the present disclosure.
Figure 6:
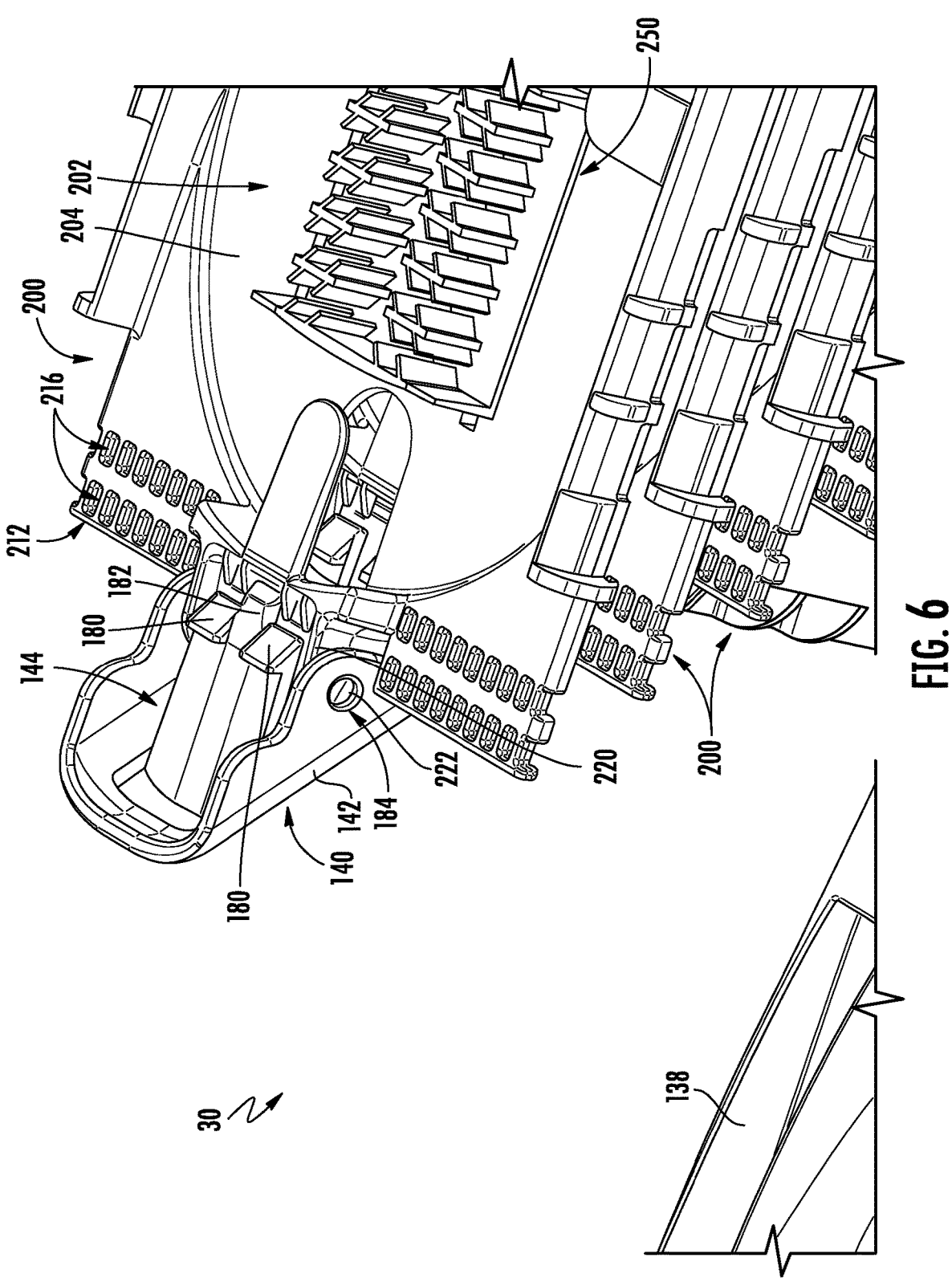
FIG. 6 is a perspective view of a portion of an organizer assembly, illustrating hinge assemblies and organizer trays with the organizer trays in first positions, in accordance with embodiments of the present disclosure.
Figure 7:
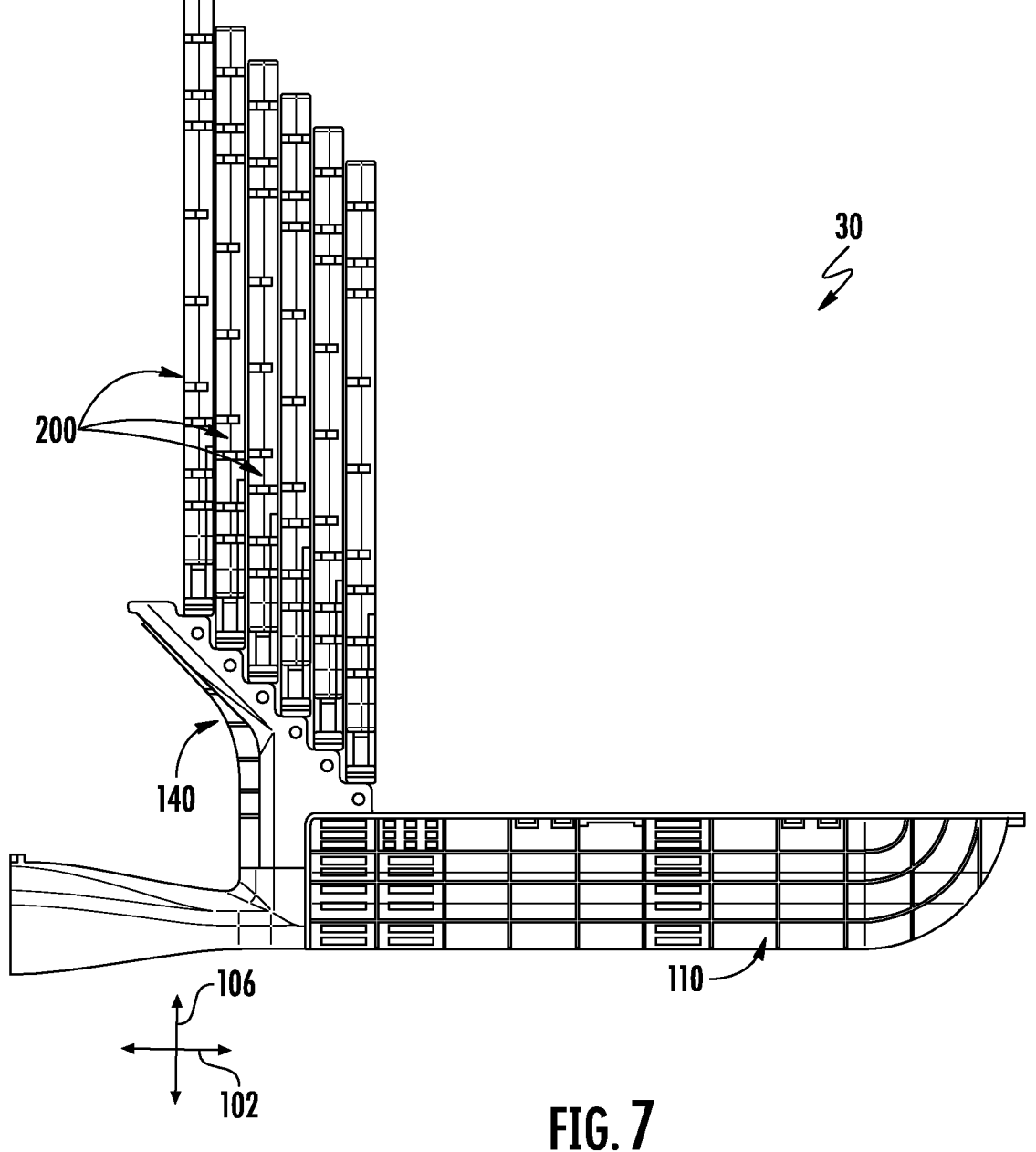
FIG. 7 is a side view of an organizer assembly, with a plurality of organizer trays connected thereon in second positions, in accordance with embodiments of the present disclosure.
Figure 8:
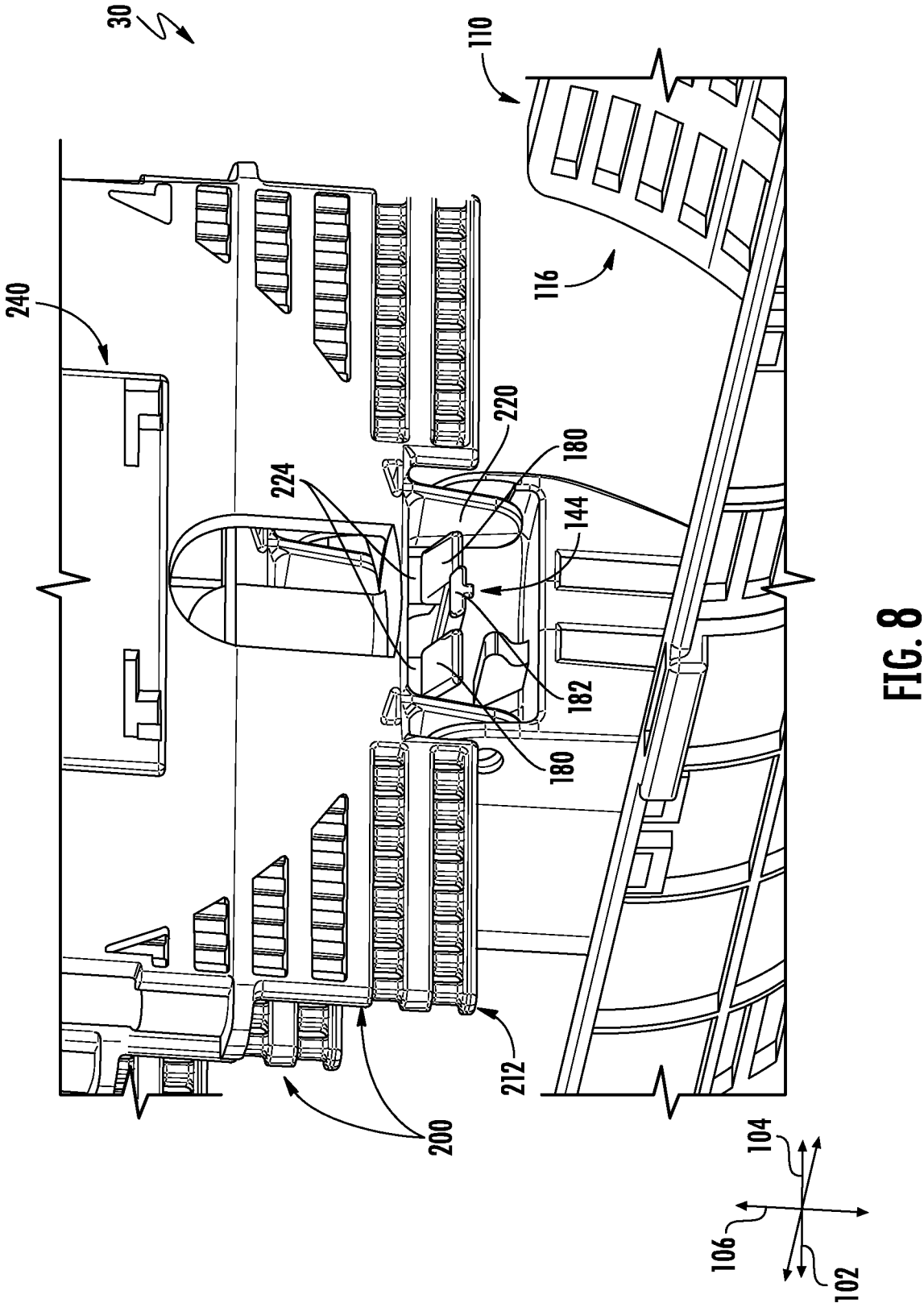
FIG. 8 is a perspective view of a portion of an organizer assembly, illustrating hinge assemblies and organizer trays with the organizer trays in second positions, in accordance with embodiments of the present disclosure.
Figure 12:
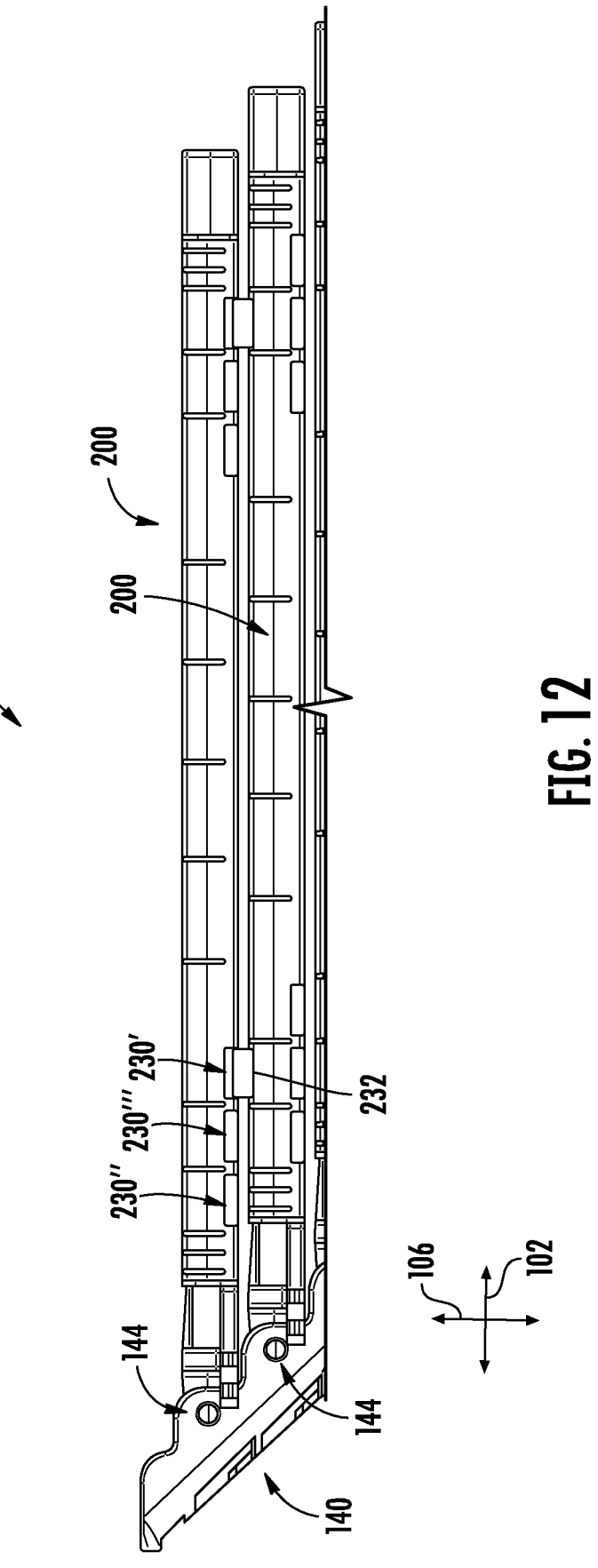
FIG. 12 is a side view of organizer trays in first positions in accordance with embodiments of the present disclosure.
Figure 13:
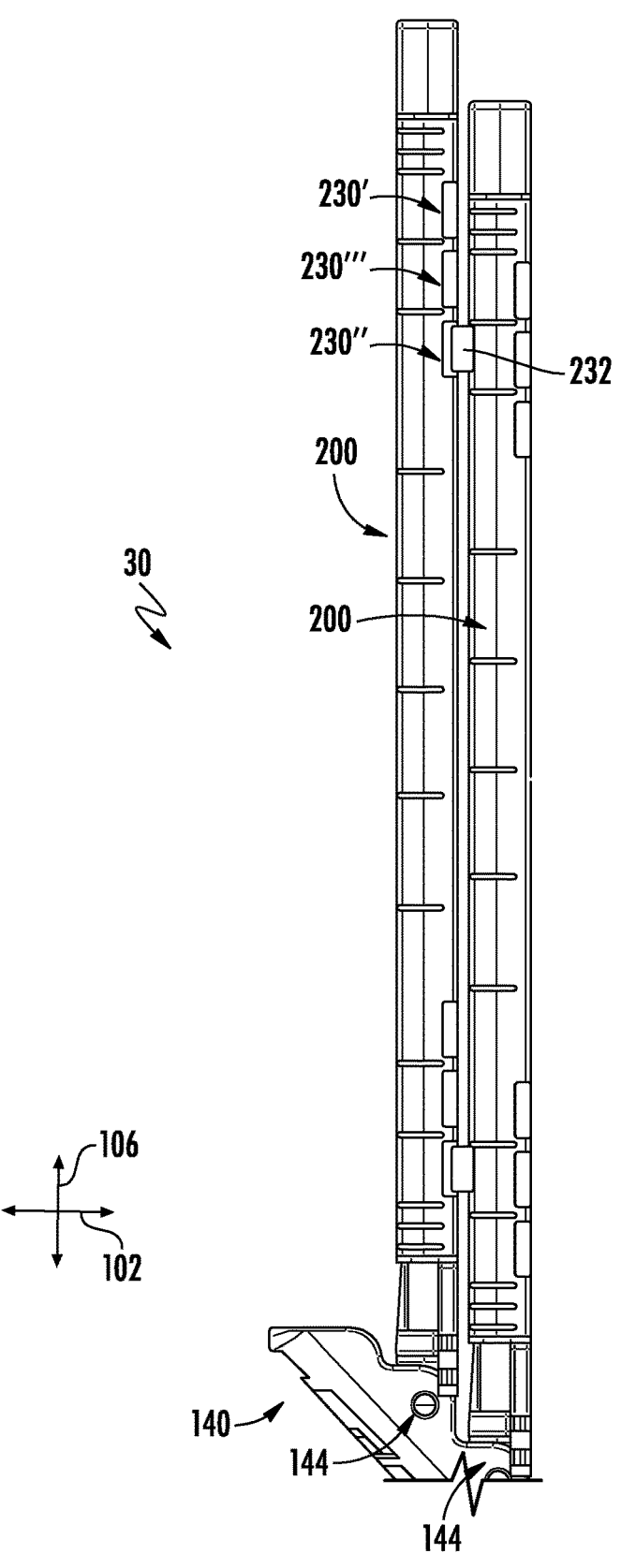
FIG. 13 is a side view of organizer trays in second positions in accordance with embodiments of the present disclosure.

Each organizer tray 200 is rotatably connectable, and thus may be rotatably connected, to the bracket assembly 140, such as to one of the plurality of hinge assemblies 144. Each organizer tray 200 may be rotatable, such as between a first position wherein the organizer tray 200 is aligned along the longitudinal direction 102 (as shown in FIGS. 5, 6, and 12) and a second position wherein the organizer tray 200 is aligned along the transverse direction 106 (as shown in FIGS. 7, 8, and 13).

For example, each organizer tray 200 may include a main body 202. Main body 202 may, for example, include a base wall 204, a first sidewall 206, a second sidewall 208, and a front wall 210, and may further define a rear end 212. First sidewall 206 and second sidewall 208 may be spaced apart along the lateral direction 104. Front wall 210 and rear end 212 may be spaced apart (such as along the longitudinal direction 102 when in the first position). The rear end 212 may be an open end, as shown, such that cables 42 or transmission elements thereof being directed along and parallel to the longitudinal direction 102 can enter or exit an interior 214 of the organizer tray 200 through the rear end 212, when the organizer tray 200 is in the first position. The front wall 210 and sidewalls 206, 208 may define a closed end and closed sides.

In some embodiments, a plurality of apertures 216 may be defined in the base wall 204, such as at the rear end 212. Each aperture 216 may be utilized to secure a cable 42 (or transmission element thereof) directly to the base wall 204 and organizer tray 200 thereof, such as using a suitable zip-tie or other suitable fastener. Notably, no additional cable/transmission element securement components are included on the organizer tray 200.

Organizer tray 200 may further include one or more connector arms 220 which may extend from the main body 202. For example, each connector arm 220 may extend from the base wall 204, such as along the transverse direction 106 when in the first position. The connector arms 220 may be removably connected to the hinge assembly 144, thus rotatably connecting the organizer tray 200 thereto. For example, protrusions 222 provided on the arms 220 may be inserted in depressions 184 to rotatably connect the organizer tray 200 to the hinge assembly 144.

As discussed, each of the plurality of organizer trays 200 may be rotatable between a first position and a second position. Further, each organizer tray 200 may advantageously be releasably securable in the second position, thus facilitating efficient loading of cables 42 and transmission elements thereof, splicing, etc., into other organizer trays 200 and the assembly 30 generally. The hinge assembly 144 which rotatable connects the organizer tray 200 to the bracket assembly 140 may releasably secure the organizer tray 200 in the second position.

For example, in exemplary embodiments as illustrated in FIG. 8, the one or more positioning tabs 182 of the associated hinge assembly 144 may contact and releasably secure the organizer tray 200 in the second position. In some embodiments, the organizer tray 200 may include one or more contact tabs 224, each of which extends from the rear end 212 of the body 202. When the organizer tray 200 is moved to the second position, each contact tab 224 may contact a positioning tab 182 and releasably secure the organizer tray 200 in the second position. For example, each contact tab 224 may ride up the tapered front surface of a positioning tab 182 and then rest in contact with a rear surface of the positioning tab 182 when the organizer tray 200 reaches the second position.

Further, in exemplary embodiments, the organizer tray 200 may be released from being secured in the second position to move from the second position to the first position. For example, movement of the release tab 182 may cause movement of the positioning tab(s) 180 out of contact with the organizer tray 200 (such as the contact tab(s) 224) thereof such that the organizer tray 200 can move from the second position to the first position. In exemplary embodiments, a user may apply force to the release tab 182 to cause such movement. For example, such force may pivot the release tab 182 and, due to a material connection between the release tab 182 and positioning tab(s) 180, also cause pivoting of the positioning tab(s) 180.

Figure 14:
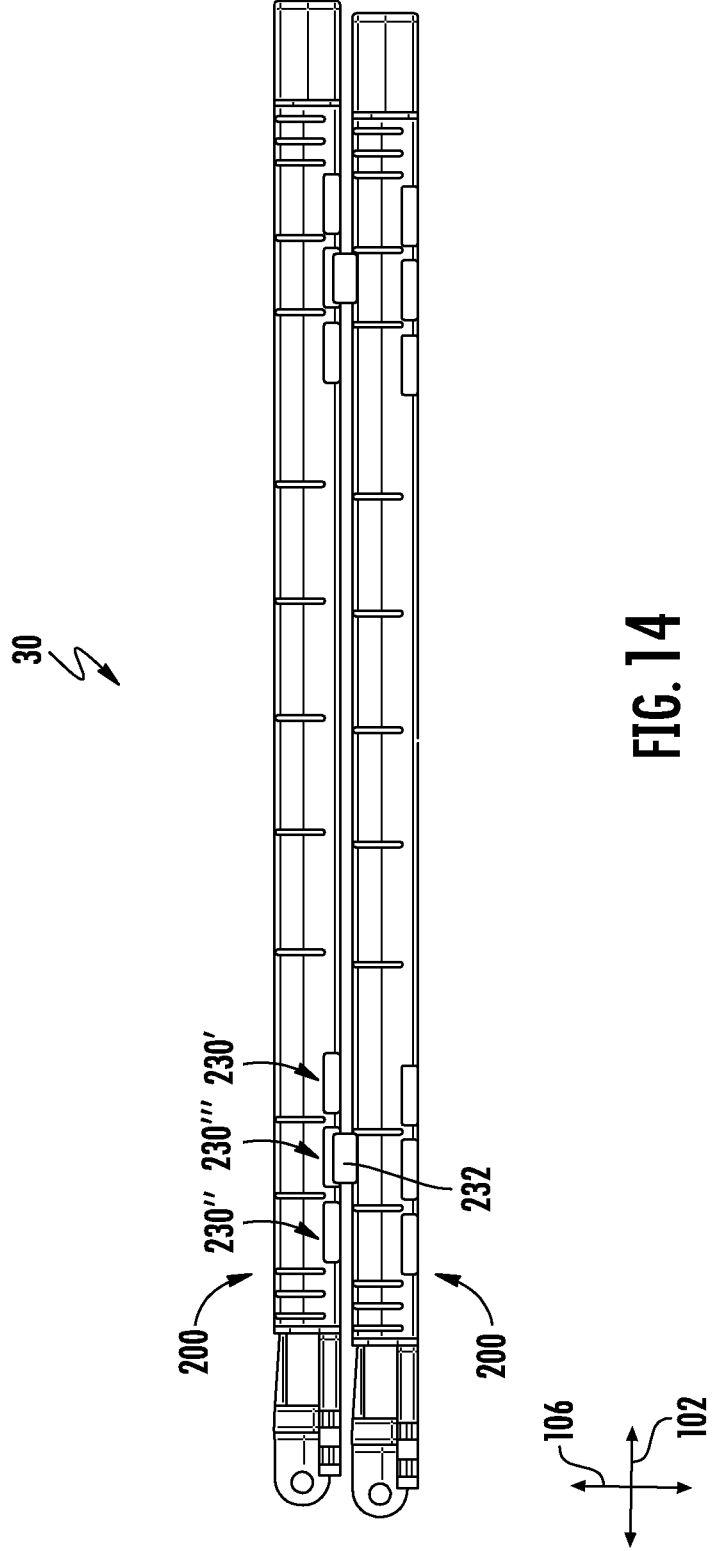
FIG. 14 is a side view of organizer trays removed and stacked in accordance with embodiments of the present disclosure.

Referring now in particular to FIGS. 12 through 14, each organizer tray 200 may advantageously include features for ensuring and securing proper positioning of the organizer trays 200 relative to each other in the first and second positions. For example, each organizer tray 200 may include one or more pluralities of positioning slots 230 and one or more positioning tabs 232. The slots 230 may, for example, be defined in exterior surfaces of the first sidewall 206 and/or second sidewall 208, such as adjacent or at the base wall 204. The positioning tab(s) 232 may extend from the first sidewall 206 and/or second sidewall 208, such as at a top of the organizer tray 200 opposite the base wall 204.

Advantageously, a positioning tab 232 of an organizer tray 200' may be inserted into a different positioning slot 230 of a plurality of positioning slots 230 in a neighboring organizer tray 200" depending on the positions of the organizer trays 200. For example, a positioning tab 232 of an organizer tray 200' may be inserted in one of the plurality of positioning slots 230' of a neighboring organizer tray 200" when these trays 200', 200" (such as, for example, the plurality of organizer trays 200) is in the first position (see FIG. 12). The positioning tab 232 of the organizer tray 200' may be inserted in another one of the plurality of positioning slots 230" of the neighboring organizer tray 200" when these trays 200', 200" (such as, for example, the plurality of organizer trays 200) is in the second position (see FIG. 13).

As discussed, in some embodiments the organizer trays 200 may be removable from the bracket assembly 140 and organizer assembly 30 generally. In some embodiments, the positioning tab 232 of the organizer tray 200' may further be inserted in yet another one of the plurality of positioning slots 230''' of the neighboring organizer tray 200" when these trays 200', 200" (such as, for example, the plurality of organizer trays 200) are removed from the bracket assembly 140 and stacked together, such as in a vertical array (see FIG. 14). Accordingly, organization and retention of the organizer trays 200 is advantageously facilitated even when the organizer trays 200 are not connected to the bracket assembly 140 and organizer assembly 30 generally.

Figure 9:
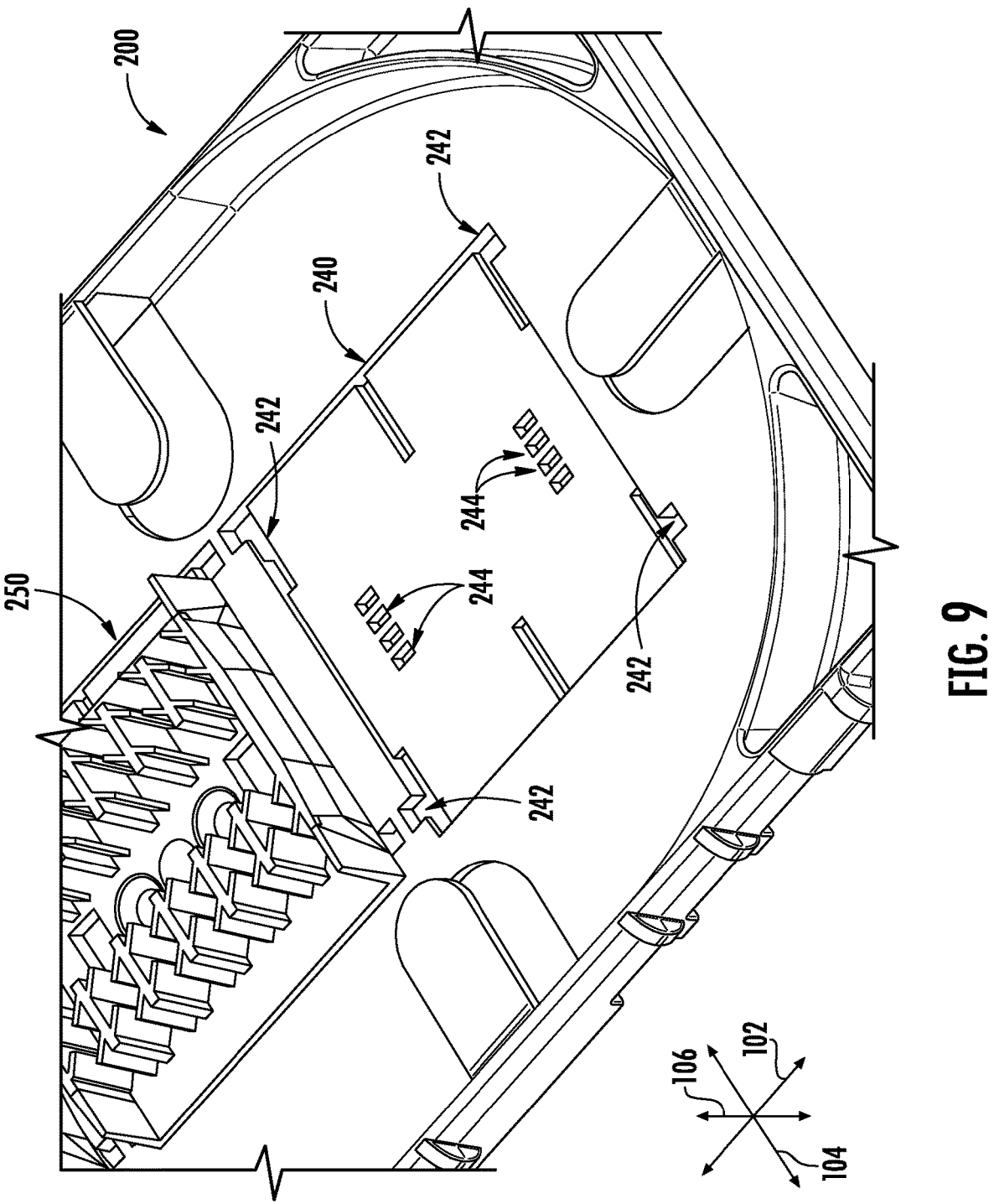
FIG. 9 is a perspective view illustrating a module mounting location in accordance with embodiments of the present disclosure.
Figure 10:
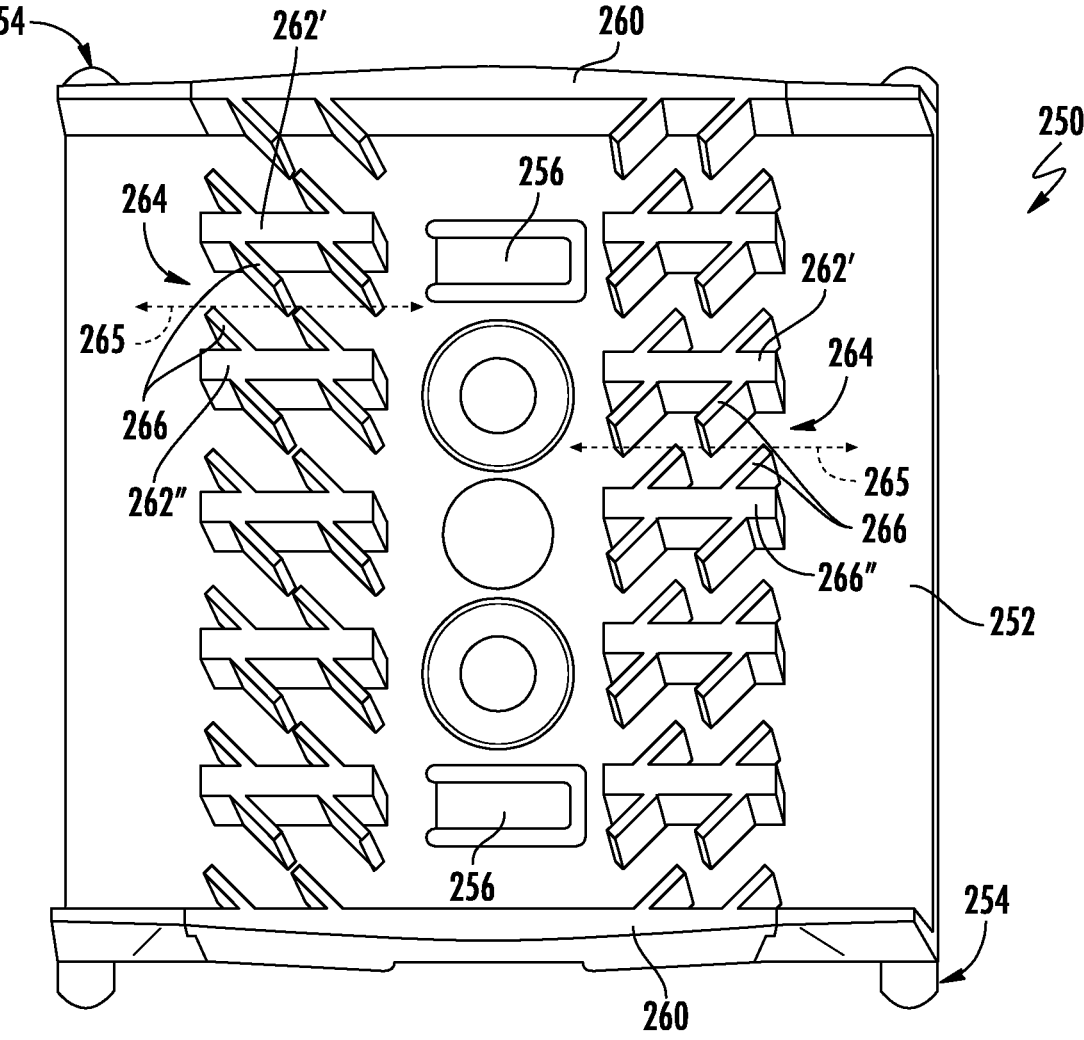
FIG. 10 is a perspective view of a splice module in accordance with embodiments of the present disclosure.
Figure 11:
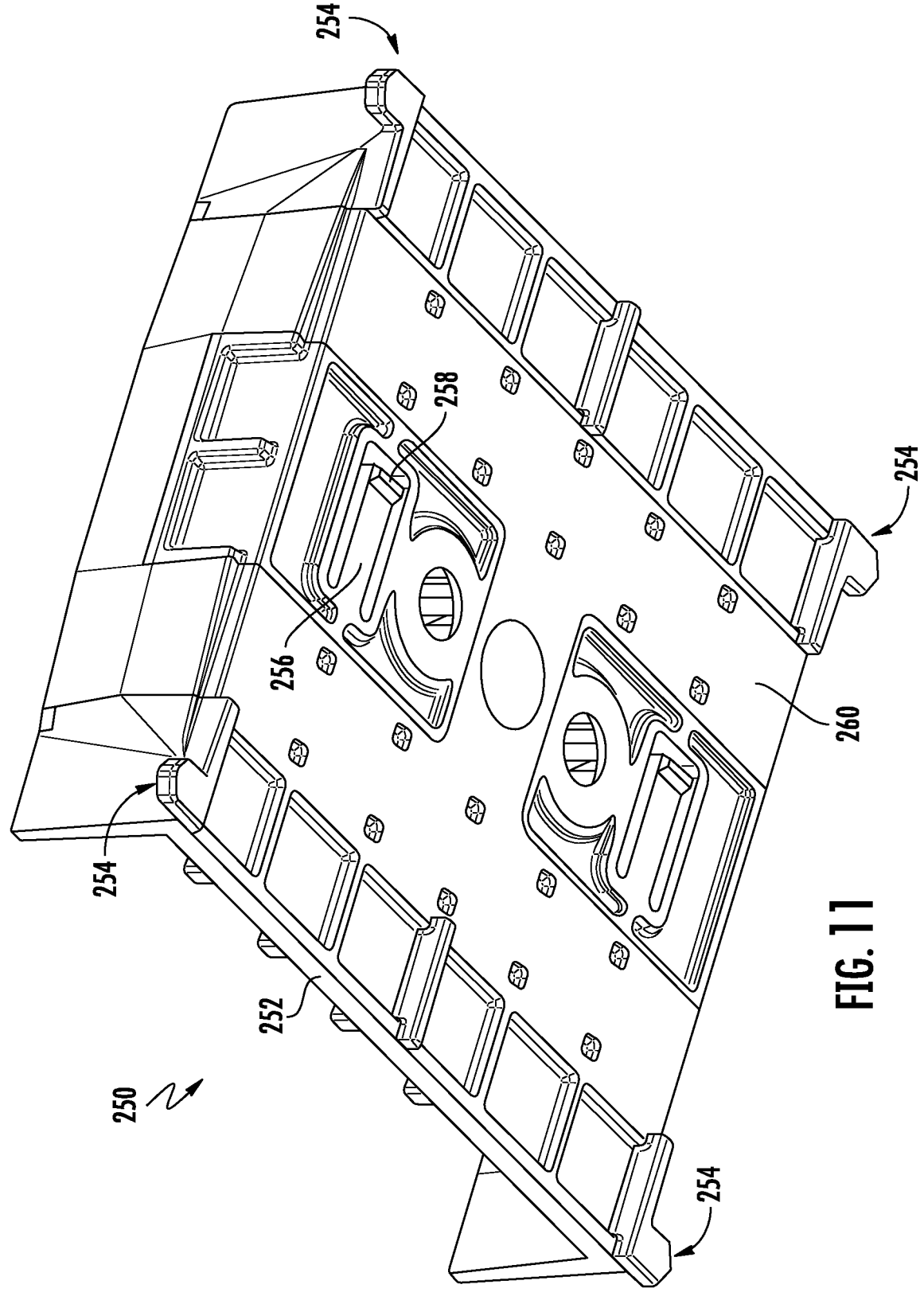
FIG. 11 is a bottom perspective view of a splice module in accordance with embodiments of the present disclosure.

Referring now in particular to FIGS. 9 through 11, each organizer tray 200 and deep tray 300 may generally accommodate one or more splice modules 250. Each splice module 250 may be removable connected to the organizer tray 200 or deep tray 300, such as to the base wall 204, 304 thereof. For example, base wall 204, 304 may include a plurality of module mounting locations 240. In exemplary embodiments, each of the module mounting locations 240 may include a plurality of leg slots 242 which may be defined through the base wall 204, 304 and one or more pluralities of positioning slots 244 which may be defined through the base wall 204, 304. The leg slots 242 may, for example, define at least a portion of a periphery of the module mounting location 240, and may for example, be disposed at corners of the module mounting location 240. Each plurality of positioning slots 244 may be defined within the periphery of the module mounting location 240, and may for example extend in a linear array. The leg slots 242 and positioning slots 244 may generally facilitate removable connection of a splice module 250 to the organizer tray at a module mounting location 240.

Each splice module 250 may, for example, include a base 252 and a plurality of legs 254 extending from the base 252, such as below the base 252 as shown. The legs 254 may further extend from and at least partially define a periphery of the base 252, and may further be disposed at corners of the base 252. To removably connect a splice module 250 to an organizer tray 200 at a module mounting location 240, each leg 254 may be inserted into one of the leg slots 242 of a module mounting location 240. Further, a splice module 250 may include one or more cantilevered arms 256 extending from the base 252, such as below the base 252 as shown. Each cantilevered arm 256 may include a tab 258 at a distal end thereof. To removably connect a splice module 250 to an organizer tray 200 at a module mounting location 240, the cantilevered arm 256, such as the tab 258 thereof, may be inserted in one of a plurality of positioning slots 244 of a module mounting location 240.

In exemplary embodiments, a splice module 250 may be removably connectable to an organizer tray 200, such as at a module mounting location 240, in multiple different orientations. For example, the plurality of positioning slots 244 may be oriented such that the cantilevered arm 256, such as the tab 258 thereof, may be inserted in a different one of a plurality of positioning slots 244 depending on the orientation of the splice module 250.

Splice modules 250 in accordance with the present disclosure may advantageously be dual material components. For example, splice modules 250 may further include one or more module walls or overmolded portions 260 which are disposed on portions of the base 252, such as on a lower surface and sidewalls thereof. The overmolded portions 260 advantageously provide improved structural integrity, rigidity, and protection. The base 252, as well as the legs 254 and cantilevered arms 256 thereof, may for example, be formed from a hard plastic such as polycarbonate or nylon. The overmolded portions 260 may be formed from suitable elastomers, such as vulcanized elastomers.

Splice modules 250 in accordance with the present disclosure may further include a plurality of partitions 262, each of which may extend from the base 252. The partitions 262 may be generally parallel to each other, and neighboring partitions 262 may define channels 264 therebetween. Partitions 262 extending from the module wall or portion 260 extend along a direction between the lateral axis and the longitudinal axis, such as an oblique direction. The partition 262 may be deformable to allow a splice sleeve to affix to the splice module between pairs of module walls or overmolded portions 260. Each channel 264 may define and extend along a longitudinal channel axis 265, as shown. Further, one or more arms 266 may extend from one or more of the neighboring partitions 262 into one or more of the channels 264 defined by such neighboring partitions 262. Such arms 266 may extend into the channels 264 at an angle to the longitudinal channel axis 265, as shown. For example, a first partition 262' of neighboring partitions 262 may include one or more arms 266 extending into a channel 264 defined by the neighboring partitions 262, and a second partition 262" of neighboring partitions 262 may include one or more arms 266 extending into the channel 264 defined by the neighboring partitions 262. Further, in exemplary embodiments as shown, the one or more arms 266 extending into a channel 264 from a first partition 262' may extend in a direction opposite the direction of the one or more arms 266 extending into the channel 264 from a second partition 262".

In exemplary embodiments, partitions 262 and arms 266 of splice modules 250 may be formed from suitable elastomers, such as vulcanized elastomers.

Splice modules 250 in accordance with the present disclosure, and in particular the configuration of the partitions 262 and arms 266, are particularly advantageous due to their versatility and flexibility in accommodating various components. For example, a channel 264 of a splice module 250 may be capable of holding triple-stacked single spliced transmission elements, double-stacked ribbon spliced transmission elements, mechanical splices, splitter modules from 1:2 to 1:32, PLCs, etc.

Organizer trays 200 may further include one or more retainer tabs 270, each of which may extend from a wall, such as wall 206, 208, or 210, into the interior 214. Such retainer tabs 270 may generally assist in routing and retaining cables 42 and transmission elements in the interior 214 during assembly, splicing, etc., thereof.

Referring now to FIGS. 15-18, embodiments of a deep organizer tray 300 (hereinafter, "deep tray 300") are provided. The deep tray 300 may be configured substantially similarly as described with regard to the organizer trays 200. The deep tray 300 includes a main body 302 having a plurality of walls including a base wall 304, a first sidewall 306, a second sidewall 308, and a front wall 310, and may further define a rear end 312. The rear end 312 may include an aft wall 318. First sidewall 306 and second sidewall 308 may be spaced apart along the lateral direction 104. Front wall 310 and rear end 312 may be spaced apart (such as along the longitudinal direction 102 when in the first position). The rear end 312 may be an open end, as shown, such that cables 42 or transmission elements thereof being directed along and parallel to the longitudinal direction 102 can enter or exit an interior 314 of the deep tray 300 through the rear end 312, when the deep tray 300 is in the first position. The front wall 310 and sidewalls 306, 308 may define a closed end and closed sides.

A plurality of tabs 370 is extended from one or more of the first sidewall 306, the second sidewall 308, the front wall 310, or the aft wall 318. The plurality of tabs 370 each extend toward the interior 314 from the respective wall, such as along the lateral direction 104 from the sidewalls 306, 308, or along the longitudinal direction 102 from the front wall 310. The plurality of tabs 370 at the deep tray 300 include an upper retention tab 372 extending from one or more of the first sidewall 306, the second side wall 308, or front wall 310. The plurality of tabs 370 further include a lower retention tab 374 extending from one or more of the first sidewall 306, the second side wall 308, front wall 310, or the hinge assembly 344.

The lower retention tab 374 is positioned proximate along the transverse axis to a base wall 304 relative to the upper retention tab 372. The upper retention tab 372 may particularly extend from, or approximately from, an upper peripheral edge 368 of the deep tray 300 along the transverse direction 106. The edge 368 may extend along the sidewalls 306, 308 and the front wall 310. The deep tray 300 may have any appropriate depth from the base wall 304 to the upper edge 368. In a particular embodiment, the edge 368 is approximately 1.75 inches to approximately 2.75 inches from the base wall 304. The upper retention tab 372 may extend from the wall 306, 308, 310 from between approximately 80% to approximately 100% of a distance of the wall along the transverse direction 106. The lower retention tab 374 may extend from the wall 306, 308, 310 from between approximately 40% to approximately 60% of a distance of the wall along the transverse direction 106.

Figure 15:
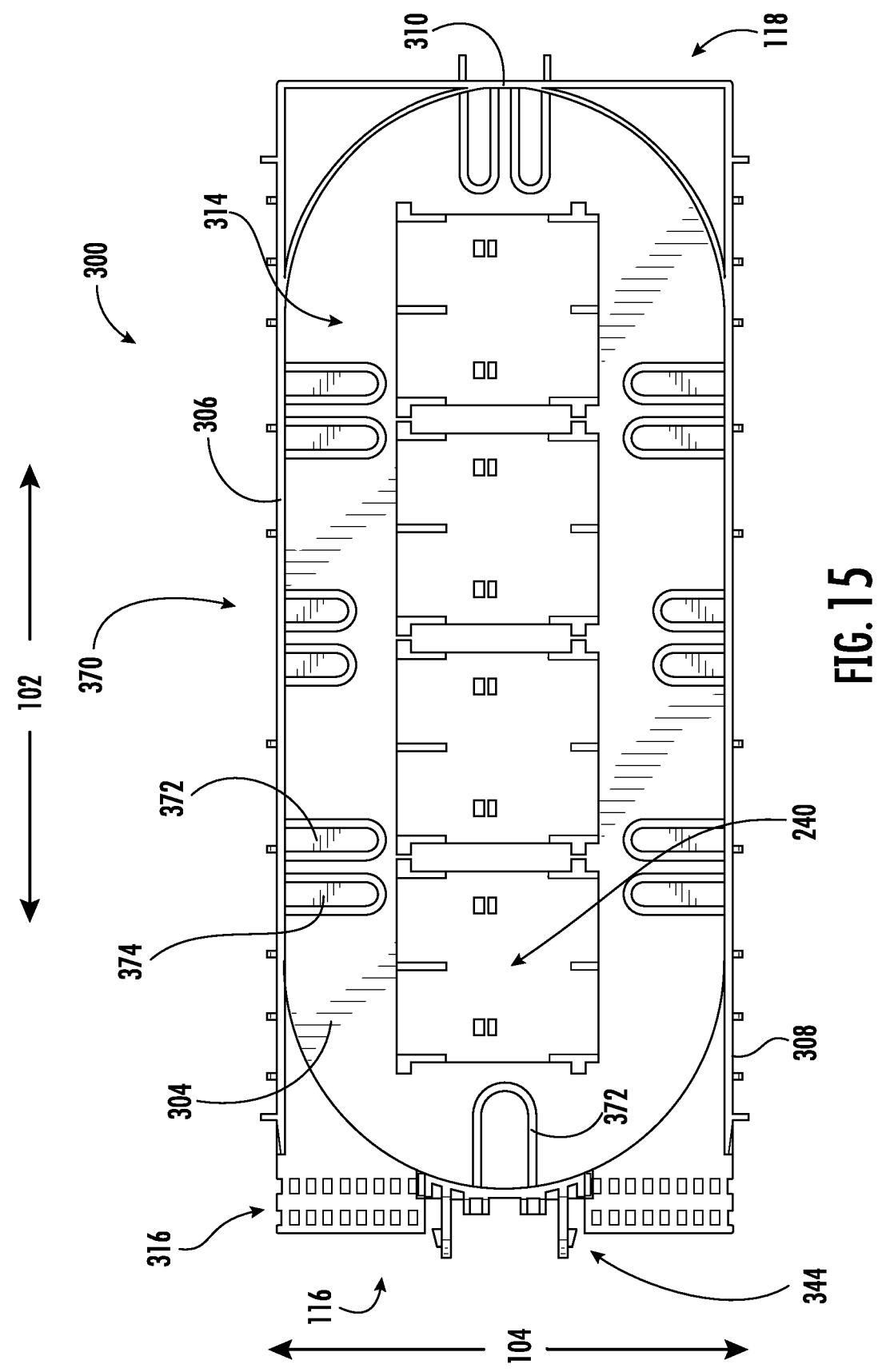
FIG. 15 is a top-down view of a deep tray in accordance with embodiments of the present disclosure.
Figure 16:
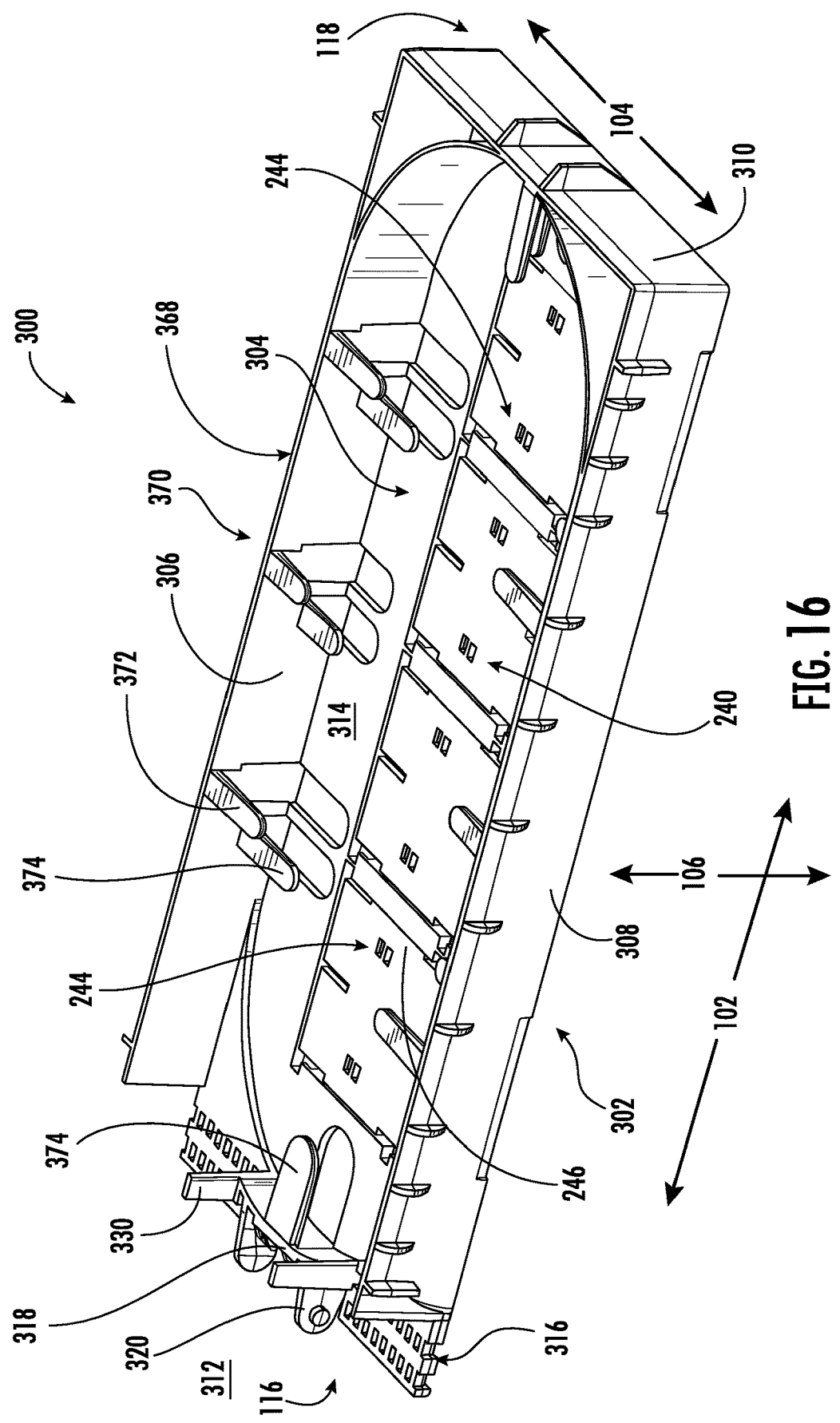
FIG. 16 is a perspective view of a deep tray in accordance with embodiments of the present disclosure.
Figure 17:
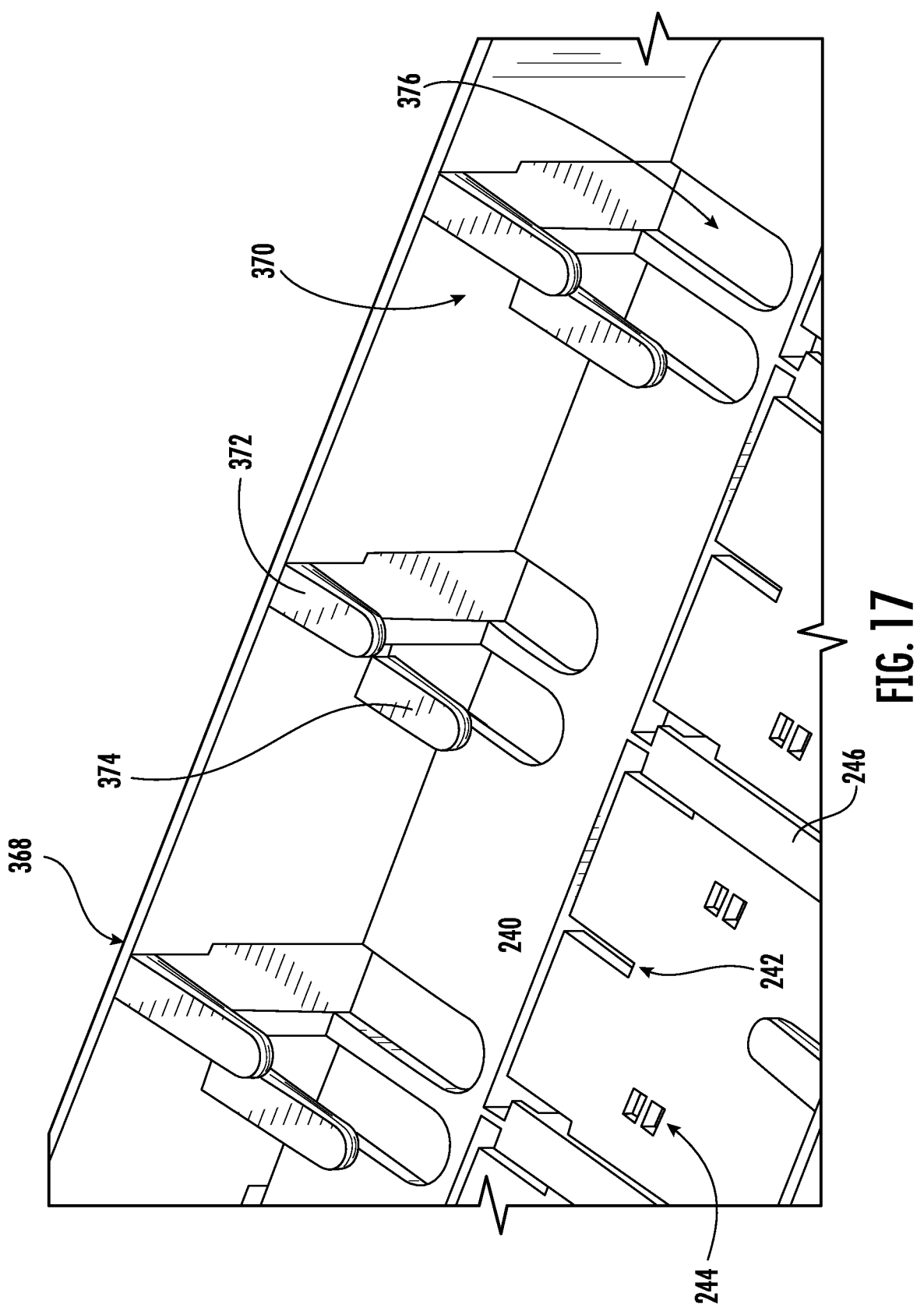
FIG. 17 is a perspective view of a portion of the deep tray in accordance with embodiments of the present disclosure.
Figure 18:
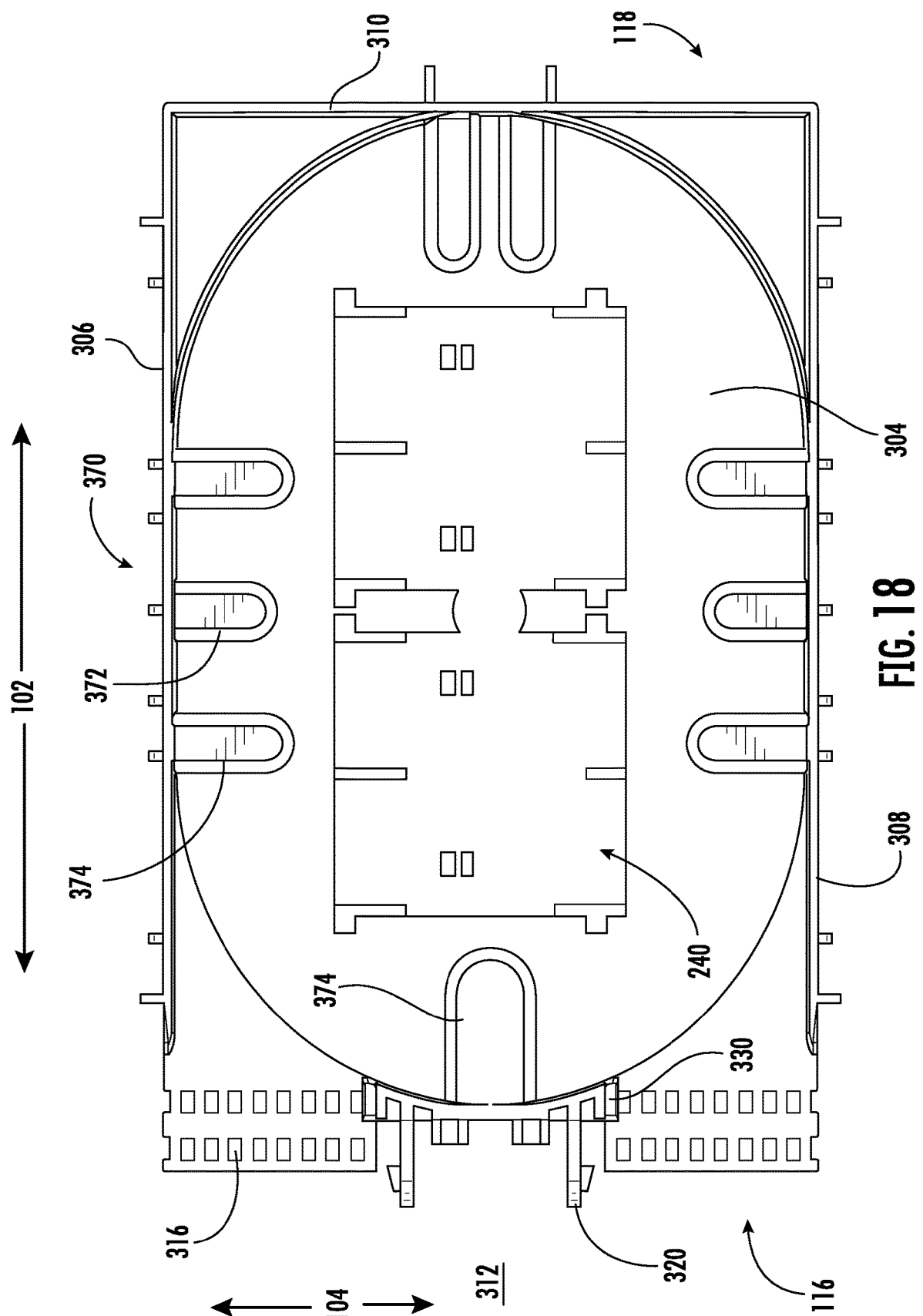
FIG. 18 is a top-down view of a deep tray in accordance with embodiments of the present disclosure.

In particular embodiments, such as depicted in FIGS. 15-17, the plurality of retainer tabs 370 are formed in pairs including the upper retention tab 372 and the lower retention tab 374. In another embodiment, such as depicted in FIG. 18, the plurality of retainer tabs 370 include combinations of one or more upper retention tabs 372 and one or more lower retention tabs 374. For instance, the plurality of retainer tabs 370 may be positioned in triplets including a pair of lower retention tabs 374 and a single upper retention tab 374, or a pair of upper retention tabs 372 and a single lower retention tab 374.

The plurality of pairs of retention tabs 370 may include a first pair in which the upper retention tab 372 and the lower retention tab 374 extend further along the lateral direction 104 relative to a second pair of the upper retention tab 374 and the lower retention tab 372. The second pair of the upper retention tab 372 and the lower retention tab 374 may be positioned along the longitudinal direction 102 between two or more of the first pair of the upper retention tab 374 and the lower retention tab 372.

In certain embodiments, the plurality of pairs of retention tabs 370 is extending from each of the first sidewall 306 and the second sidewall 308, and the second pair of retention tabs 370 is positioned at the first sidewall 306 opposite along the lateral direction 104 of the second pair of retention tabs 370 positioned at the second sidewall 308.

Referring to FIGS. 15-18, the upper retention tab 372 may be offset along the longitudinal direction 102 relative to the lower retention tab 374. In particular embodiments, the upper retention tab 372 is non-overlapping along the transverse direction 106 relative to the lower retention tab 374. For instance, in the embodiment depicted in FIG. 15, the upper retention tab 372 may be offset along the longitudinal direction 102 such that the upper retention tab 372 does not overlap the lower retention tab 374 when viewed along the transverse direction 106. The upper retention tab 372 may be offset from a respective lower retention tab 374 within a distance of five tab widths along the longitudinal direction 102, or within three tab widths along the longitudinal direction 102. Such arrangement may desirably allow for routing and retaining cable 42 and transmission elements in the interior 314 during assembly, splicing, etc. The upper and lower retention tabs 372, 374 may furthermore allow for separation of slack storage loops, allowing for minimizing difficulty in storing flat ribbon fiber optics, such as 12-fiber flat ribbon fiber optics. The two-tiered upper and lower retention tabs may furthermore provide such benefits while allowing for any known storage methods while increasing capacity or area at which the fibers may be routed. The reduction of entanglement may reduce difficulties in storing fiber optic ribbons while reducing risks of attenuation of the fibers.

The upper and lower retention tabs 372, 374 may generate slack storage space for fiber optics, such as flat ribbon fiber optics, allowing for technicians to perform splices without necessitating pulling fiber from a housing basket. Such structures may allow for improved accessibility and decreased installation time.

Figure 19:
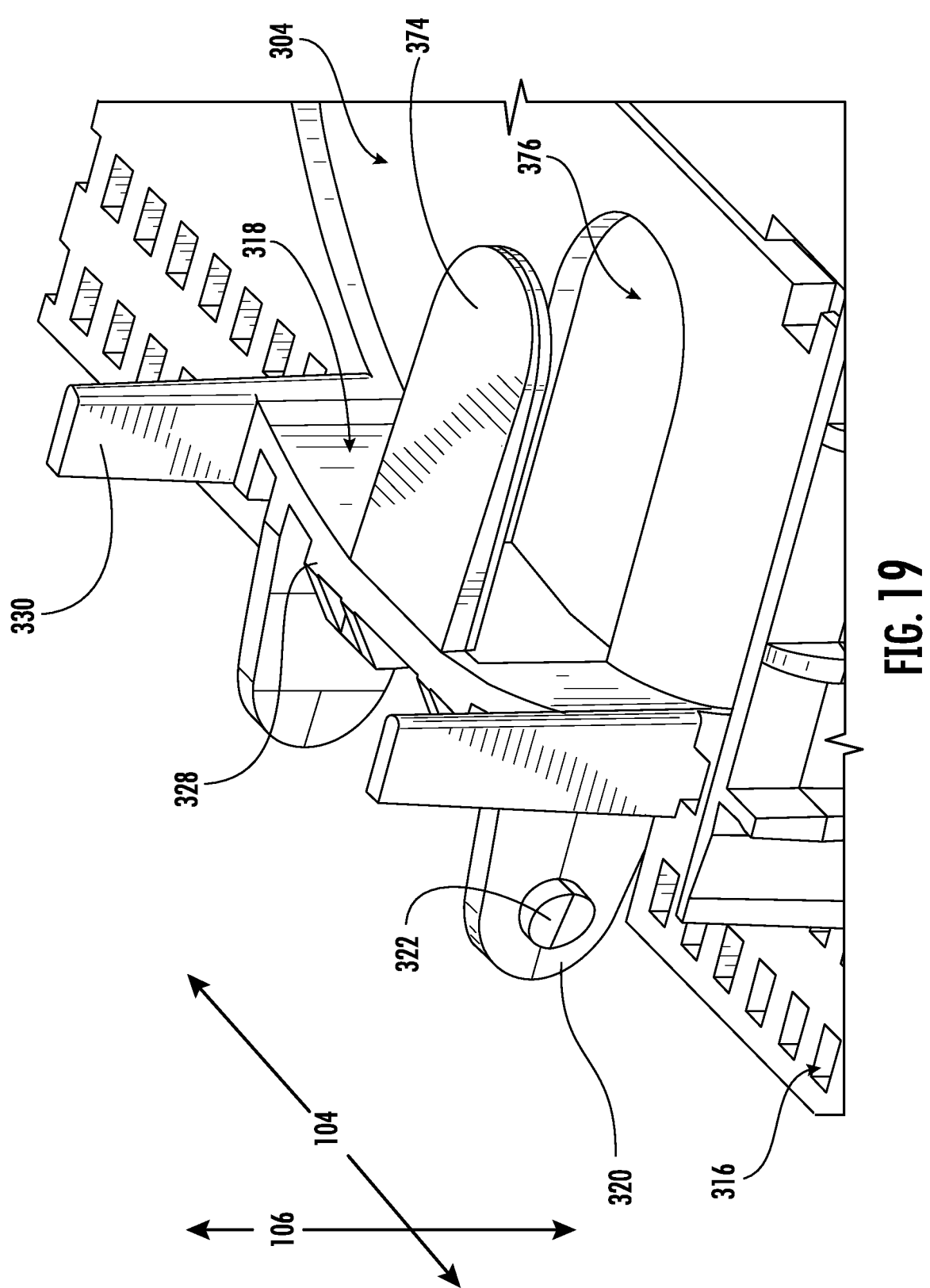
FIG. 19 is a perspective view of a portion of the deep tray in accordance with embodiments of the present disclosure.

Referring now to FIG. 19, the deep tray 300 includes one or more connector arms 320 extending from the main body 302, such as described with regard to connector arm 220 at the organizer tray 200. Connector arm 320 may include protrusion 322, such as described with regard to protrusion 222 at arm 220 and depression 178. The deep tray 300 may form an aft wall 318 extending from the base wall 304 along the lateral direction 104. The aft wall 318 further extends along the transverse direction 106. The aft wall 318 may particularly extend partly along the lateral direction 104, such that a plurality of apertures 316 is formed through the base wall 304 between the aft wall 318 and one or both sidewalls 306, 308. The aft wall 318 may additionally extend partly along the transverse direction 106 relative to an extension of the sidewalls 306, 308 along the transverse direction 106. The aft wall 318 is positioned at the rear end 312 of the deep tray 300.

In various embodiments, the aft wall 318 may extend such that an upper edge 328 of the aft wall 318 along the transverse direction 106 is approximately co-planar to the lower retention tab 374. Accordingly, in certain embodiments, the aft wall 318 may extend to approximately 40% to approximately 60% of the distance of the sidewalls 306, 308 along the transverse direction 106.

Referring still to FIG. 19, the deep tray 300 may include one or more fiber retention posts 330 extending along the transverse direction 106. The post 330 is positioned at one or more ends of the aft wall 318, such as between the aft wall 318 and the plurality of apertures 316 along the lateral direction 104. The post 330 may extend along the transverse direction 106 at least the distance of the aft wall 318 along the transverse direction 106. In some embodiments, the post 330 extends at least the distance of the sidewalls 306, 308 or the front wall 310 along the transverse direction 106. The post 330 may allow for pluralities of the organizer tray 200 and/or deep tray 300 to be stacked along the transverse direction 106, such that the post 330 contacts a bottom side of the base wall of the adjacent tray. The post 330 may further position the connector arm 220, 320 of the adjacent tray 200, 300 proximate to every other row of depressions 178 along the transverse direction 106. The post 330 may be configured to extend along the transverse direction 106 based on the position of the depression 178 along the transverse direction 106. When the organizer tray and/or deep tray is in a first position, the tray may be oriented substantially flat along the longitudinal direction 102, or within approximately 15 degrees greater than or lesser than the longitudinal direction 102.

In certain embodiments, the one or more connector arms 320, or a pair of connector arms 320, is extending along the longitudinal direction 102 from between (along the lateral direction 104) a pair of fiber retention posts 330. The post 330 may allow for one or more organizer trays 200 to stack on top of the deep tray 300 and hinge with the hinge assembly 144 such as described herein. Openings 376 formed into the base wall 304 may allow for space between tabs 270, 370 at an organizer tray 200 or deep tray 300 and the base wall 204, 304 at an adjacent tray 200, 300. Geometry of the openings 376 through the base wall 304 may correspond substantially to respective tabs along the transverse direction 106.

Figure 20:
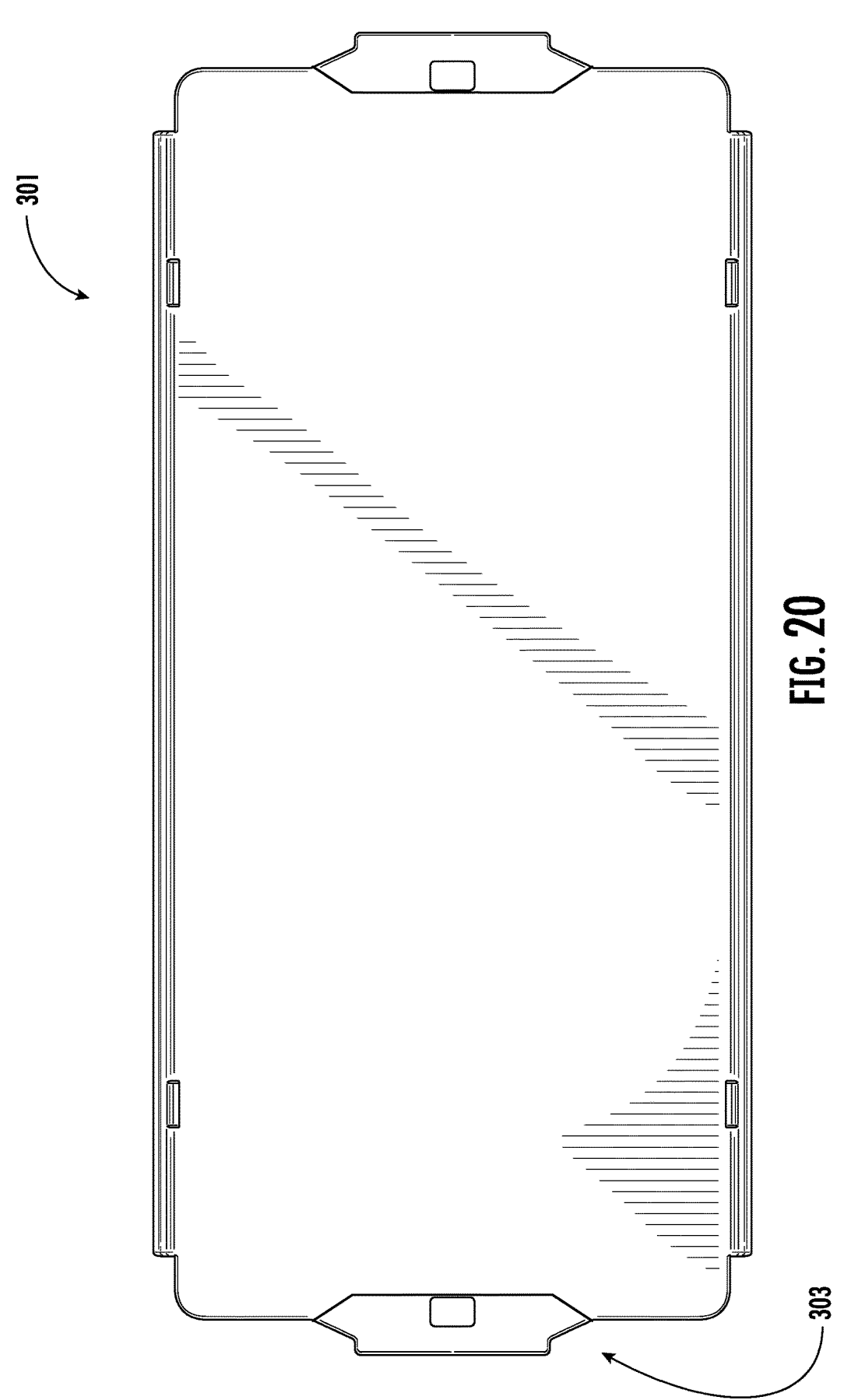
FIG. 20 is a top-down view of a cover for a deep tray in accordance with embodiments of the present disclosure.

Referring now to FIG. 20, an exemplary embodiment of a cover 301 for the tray 200, 300 is provided. The cover 301 may include a breakaway section 303 at one or both of the first end 116 or the second end 118. In certain embodiments, the breakaway section 303 is positioned corresponding to the fiber retention post 330 when the cover 301 is installed on top of the tray 200, 300. The breakaway section 303 may be configured as a selectively detachable and attachable portion separable from a main portion 305 of the cover 301. The main portion 305 forms a surface extending along the longitudinal axis and the lateral axis, such as to allow the main portion 305 to couple or position at the edge 368 of the tray 200, 300.

Referring now to FIGS. 21-24, embodiments of housing 10 including a retainer clip 400 positioned at a receptacle 500 are provided. It should be appreciated that the receptacle 500 may include any one or more embodiments of the organizer basket 110 or trays 200, 300 depicted and described herein. Receptacle 500 includes an interior 522, such as formed substantially as depicted and described in regard to any one or more embodiments of interior 120, 214, 314. Receptacle 500 includes base wall 504 formed substantially similarly as depicted and described in regard to any one or more embodiments of base portion 126 of basket 110, or wall 204, 304. Receptacle 500 includes a plurality of sidewalls 520 formed substantially similarly as depicted and described in regard to any one or more embodiments of walls 206, 208, 306, 308, or sides 122, 124 of basket 110. Base wall 504 may extend from the plurality of sidewalls 520 along longitudinal direction 102 and lateral direction 104. Receptacle 500 includes the plurality of apertures 516 formed at the base wall 504, such as apertures 16, 216, 316. Base wall 504 may additionally, or alternatively, include slotted apertures 517 extending along the longitudinal direction 102. Receptacle 500 includes first end 506, forming an open end such as described regarding first end 116. First end 506 allows cables 42 or transmission elements thereof to be directed along the longitudinal direction 102 to enter or exit interior 522. Receptacle 500 may include second end 508, forming a closed end such as described regarding second end 118. Second end 508 may inhibit cables 42 or transmission elements thereof from entering interior 522.

Receptacle 500 may include an end wall 510 such as depicted and described regarding front wall 210, 310 or second end 118 of basket 110. End wall 510 may extend substantially along lateral direction 104 between the plurality of sidewalls 520. Interior 522 may generally be formed between the plurality of sidewalls 520 and base wall 504. The plurality of sidewalls 520 forming, at least in part, interior 522 may furthermore include the end wall 510.

Embodiments of the retainer clip 400 are fixable to receptacle 500 at one or more of the plurality of apertures 516. Embodiments of the retainer clip 400 may include a single tier retainer clip, such as depicted at retainer clip 400a, or a multi-tier retainer clip, such as depicted at 400B. A mutually orthogonal coordinate system may be defined for the retainer clip 400 in accordance with the present disclosure, and may include a mutually orthogonal longitudinal axis 401, lateral axis 402, and transverse axis 403. Extensions along each respective axis may be described as the longitudinal direction 401, the lateral direction 402, and the transverse direction 403, respectively. In certain embodiments, the coordinate system relative to the retainer clip 400 may be substantially the same as the coordinate system relative to the organizer assembly 200. However, it should be appreciated that the retainer clip 400 may be fixable at different orientations relative to the organizer assembly, basket, tray, or other surface. Accordingly, the longitudinal direction, the lateral direction, and the transverse direction relative to the retainer clip may differ in angle or orientation relative to the respective longitudinal direction, the lateral direction, and the transverse direction relative to the organizer assembly or housing generally.

Embodiments of the retainer clip 400 form a pathway 410 extending along the longitudinal direction 401. In certain embodiments, the pathway 410 is extending along the longitudinal direction 401 substantially co-directional to the longitudinal direction 102 of the housing 10. The pathway 410 extends along the longitudinal direction 401 between a first clip end 404 and a second clip end 406. The first clip end 404 is distal to interior 522 of the receptacle 500. First clip end 404 and second clip end 406 each form openings into pathway 410. Cable 42 is extendable into receptacle 500 through the pathway 410.

Embodiments of the retainer clip 400, or furthermore, embodiments of the housing 10 including the retaining clip 400, help protect exposed fibers inside and outside of the housing during preparation, such as routing, splicing, attaching, and other methods for generating or maintaining functionality of a fiber optic housing and network. The retainer clip 400 covers exposed slacks of cable 42 that may be stored in the receptacle 500. Embodiments provide re-useable, re-enterable, or re-attachable retainer clips 400 at the receptacle 500, allowing for reduced costs, increased simplicity, and decreased time to prepare the housing. Such improvements may additionally provide increased protection, durability, or longevity to fibers while decreasing preparation time and improving appearance and orderliness of the cables at the housing.

Figure 25:
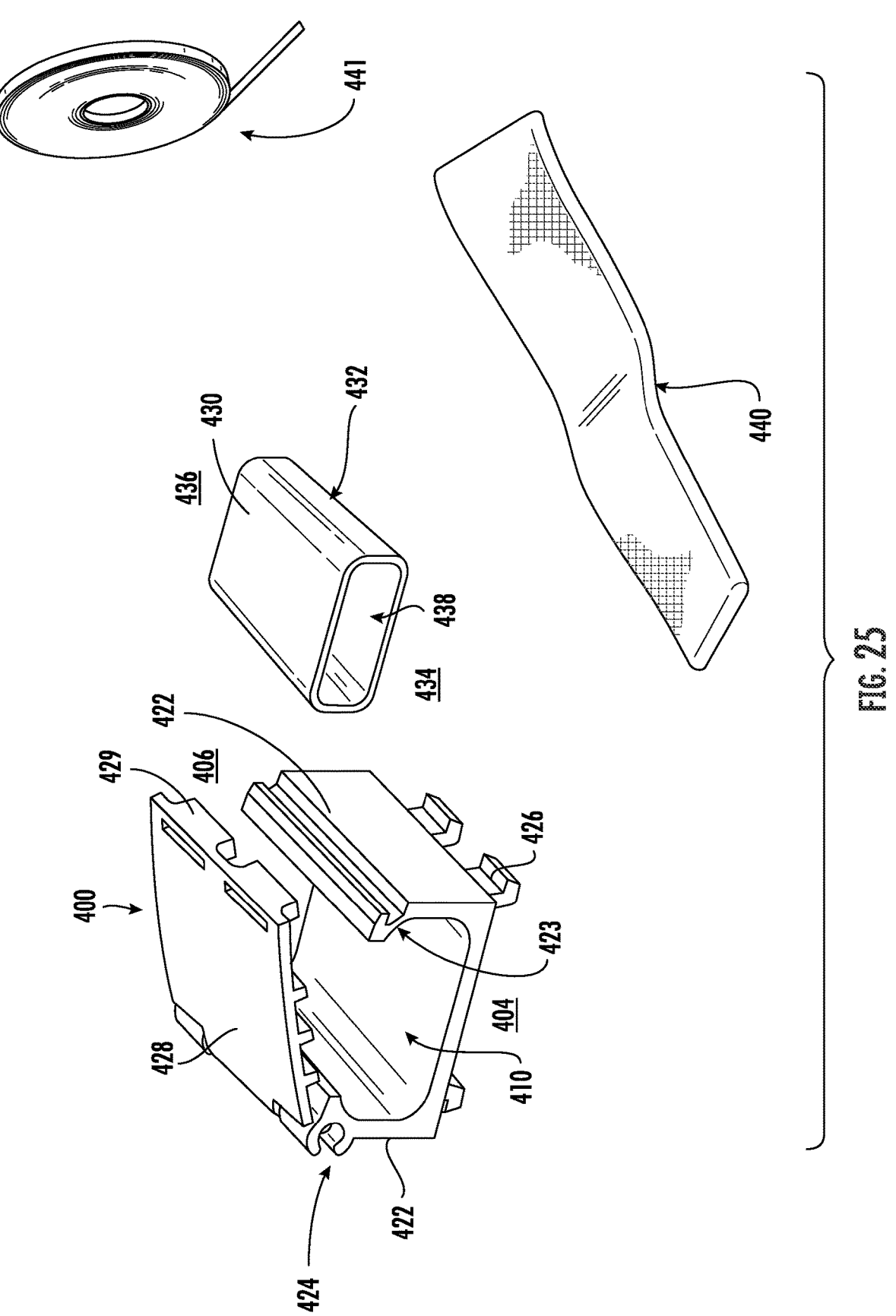
FIG. 25 is a perspective exploded view of a retainer clip, insert, and flexible liner in accordance with embodiments of the present disclosure.

Referring now to FIG. 25 and FIGS. 26A-26C, a detailed exploded perspective view of an embodiment of the retaining clip 400 and components positionable therein is provided. The retaining clip 400 may include a body 420 forming the pathway 410 extending through the body 420 between the first clip end 404 and the second clip end 406. The body 420 includes a plurality of pathway walls 422 substantially forming the pathway 410. In certain embodiments, the body 420 includes a hinge 424. At least one of the plurality of pathway walls 422 is moveable along the hinge 424 to provide an open face to the pathway 410. In FIG. 25, the at least one moveable pathway wall 422 is depicted as a lid or removable covering 428. In one embodiment, the lid 428 is rotatably attached at the hinge 424. In another embodiment, the lid 428 is formed of a compliant material allowing for the lid 428 to flex or bend along the hinge 424. Lid 428 may include a clip or snap interface 429 configured to attach or catch at a snap interface 423 at another pathway wall 422. Lid 428 may rotate, flex, bend, or otherwise move along hinge 424 and releasably attach at snap interface 423.

In various embodiments, a removeable insert 430 is positionable through the pathway 410 at the retainer clip 400. The insert 430 includes a plurality of insert walls 432 extending along the longitudinal direction 401. The insert 430 forms a slot 438 within the insert 430. The slot 438 extends substantially co-directional to the pathway 410 of the retainer clip 400 between a first insert opening 434 and a second insert opening 436.

In certain embodiments, a flexible liner 440 is positionable around a portion of the cable 42 surrounded by the insert 430 when the cable 42 is positioned through the slot 438. The flexible liner 440 may be a tube or sleeve of mesh, fabric, or other material. The flexible liner 440 may provide a meshing tube around the portion of the cable 42 extended within the retainer clip 400. The flexible liner 440 may furthermore provide a meshing tube or sleeve around the insert 430 surrounding the cable 42. The flexible liner 440 may further provide for the cable 42 to be re-enterable through the retainer clip 400 or the insert 430. Flexible liner 441 depicts a foam material that may wrap around the insert 430. The flexible liner 441 may include an adhesive appropriate for sticking to the insert 430. The flexible liner 440, 441 may provide a seal, such as to limit or mitigate fluid communication from the first clip end 404 to the second clip end 406, or from the first insert opening 434 to the second insert opening 436. The flexible liner 440, 441 may allow for securing, fixing, or otherwise inhibiting movement of the cable 42 along the longitudinal direction 401 while within the retainer clip 400. The flexible liner 440, 441 may obviate or eliminate the necessity for tie-wraps to fix the cable 42 in position through the retainer clip 400 or insert 430. The flexible liner 440, 441 may furthermore provide installation simplicity, decrease time to prepare the housing, provide cable protection, or improve aesthetic appearance.

Figures 26A, 26B, 26C:
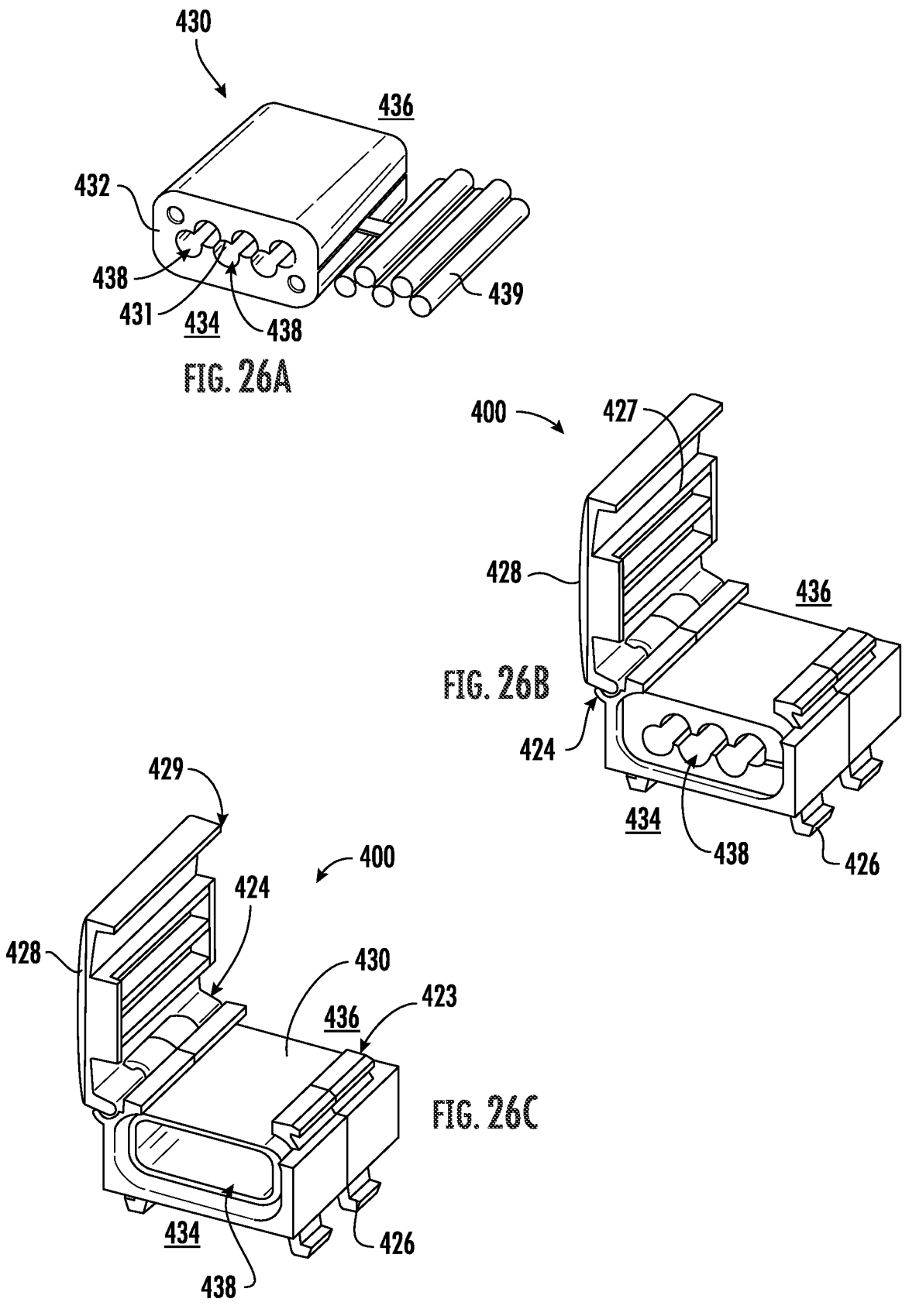
FIG. 26A is a perspective view of an insert in accordance with embodiments of the present disclosure.
FIG. 26B is a perspective view of a retainer including an insert in accordance with embodiments of the present disclosure.
FIG. 26C is a perspective view of a retainer including an insert in accordance with embodiments of the present disclosure.

In certain embodiments, such as depicted in FIGS. 26A-26B, the insert 430 includes a separation wall 431 extending along the longitudinal direction 401 between the plurality of insert walls 432 to form a plurality of slots 438. The separation wall 431 may extend along the longitudinal direction 401 from the first insert opening 434 toward the second insert opening 436. A filler 439 may be positionable at one or more slots 438 formed by the separation wall 431, such as when a fiber or cable 42 is not present at the slot 438. The filler 439 may include any appropriate material, such as a flexible material, configured to limit or mitigate fluid communication through the slot 438.

The insert 430 may be formed of a first material different from the retainer clip 400 formed from a second material. The first material is an elastic material. In various embodiments, the elastic material is an isoprene, a Styrene-butadiene rubber, a butyl rubber, a nitrile rubber, an ethylene propylene diene monomer rubber, a silicone, a polyurethane, a hydrogenated nitrile rubber, a fluoroelastomer material, or combination thereof. The second material is a thermoplastic material. In particular embodiments, the second material is a thermoplastic polymer. The relatively more flexible first material may allow for compliance or mitigate abrasion or damage against the cable 42 or the flexible liner 440. The relatively stiffer or less flexible second material provides support and fixing of the cable 42 into the receptacle 500.

In still certain embodiments, the slot 438 formed by the insert 430 is converging along the longitudinal direction 401 from the first insert opening 434 toward the second insert opening 436. Additionally, or alternatively, the pathway 410 formed by the retainer clip 400 is converging along the longitudinal direction 401 from the first clip end 404 toward the second clip end 406. In certain embodiments, the converging slot 438 and pathway 410 conform to one another. The converging geometry further includes the first insert opening 434 forming a larger cross-sectional opening than the second insert opening 436. Similarly, or alternatively, the converging geometry includes the first clip end 404 forming a larger cross-sectional opening than the second clip end 406. The converging geometry, via the slot 438 or the pathway 410, may provide desired fixing or securing of the cable 42 to the retainer clip 400. The converged second clip end 406 or second insert opening 436 may form a plane at which the cable 42 is secured in position along the longitudinal direction 401

In various embodiments, tapered geometry of the insert 430 applies compression to the walls 422 of the body 420 around the insert 430 when the insert 430 is pulled back toward the narrow end (i.e., at the second clip end 406 or second insert opening 436). The applied compression may further secure the flexible liner 440 in place, such as to prevent the flexible liner 440 from slipping out of position. In a particular embodiment, the applied compression may fix the flexible liner 440 in an area between the insert 430 and the walls 422 of the body 420.

In some embodiments, the flexible liner 440 may further provide a filler material surrounding the cable 42, or furthermore, insert 430, such as to allow the cable 42 to secure in position while limiting contact, pressure, abrasion, or friction at the cable 42. It should be appreciated that while the second clip end 406 or the second insert opening 436 may form ends of the respectively pathway 410 or slot 438, the respectively pathway 410 or slot 438 may form a converged geometry at any desired position along the longitudinal direction 401 along the respectively pathway 410 or slot 438.

Referring to FIGS. 26A-26C, the retainer clip 400 may include a stop wall 425 extending along a transverse direction. The stop wall 425 from any one or more of the plurality of pathway walls 422, or particularly from the lid 428. The stop wall 425 may be positioned at the first insert opening 434. The stop wall 425 extends along the transverse direction toward the insert 430 when the lid 428 is closed. The stop wall 425 is configured to inhibit movement of the insert 430 along the longitudinal direction 401 toward the first insert opening 434. The converged second insert opening 436 may inhibit movement of the insert 430 along the longitudinal direction 401 toward the second insert opening 436.

The retainer clip 400 may form ridges 427 at the lid 428. The ridges 427 are configured to extend along the transverse direction toward the insert 430. The ridges 427 are configured to contact the insert 430. The ridges 427 allow for spaced or intermittent contact of the lid 428 to the insert 430. The intermittent contact may limit an amount of loading placed upon insert 430. The ridges 427 may allow for a desired compliance based on the cable 42, or additionally, the flexible liner 440, and expansion or contraction of the insert 430 within the retainer clip 400, such as to reduce or mitigate damage, wear, abrasion, or pressure at the cable 42.

Figure 27:
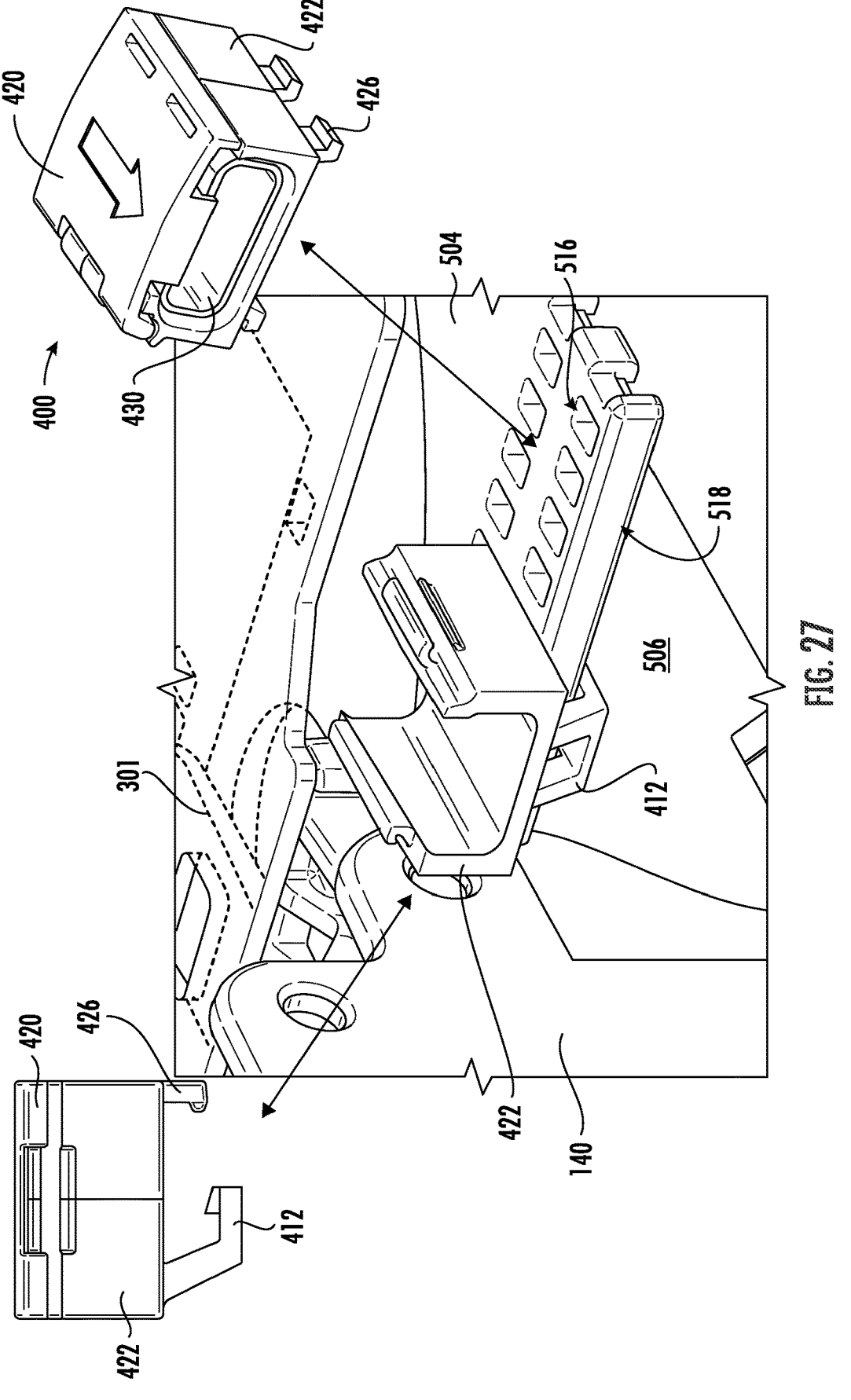
FIG. 27 is a perspective, partially-exploded view of a receptacle including the retainer clip and insert in accordance with embodiments of the present disclosure.

Referring now to FIG. 27, various embodiments of the retainer clip 400 include legs 426 extending along the transverse direction. The legs 426 are positionable through the plurality of apertures 516 at the base wall 504. In certain embodiments, the legs 426 may include a hook or trigger snap configured to latch onto the base wall 504. In still certain embodiments, the legs 426 may be sized to press fit or interference fit into the aperture 516. The legs 426 may allow the retaining clip 400 to affix to the base wall 504 though friction between the legs 426 and the surrounding surfaces forming the aperture 516 through which the leg 426 is inserted.

In certain embodiments, the retainer clip 400 includes a hook or clip 412 attachable to a perimeter 518 of an attaching structure. The clip 412 is attachable to the perimeter 518 of the base wall 504. One or more legs 426 may furthermore attach to the aperture 516 formed at the base wall 504.

Figures 28A, 28B:
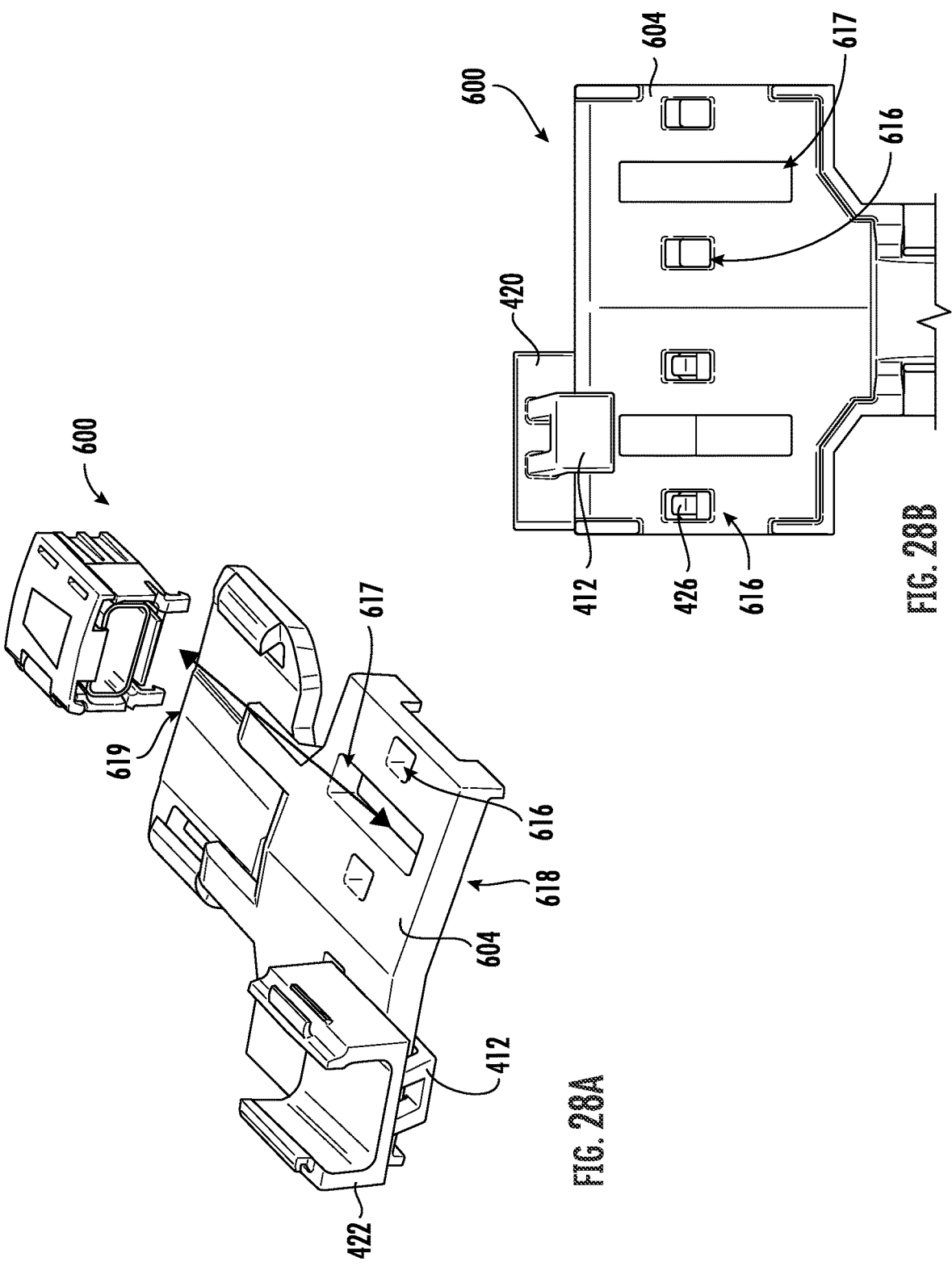
FIG. 28A is a perspective view of a retainer clip attached to an adaptor plate in accordance with embodiments of the present disclosure.
FIG. 28B is a bottom-up view of the retainer clip attached to the adaptor plate in accordance with embodiments of the present disclosure.
Figures 29, 30, 31, 32:
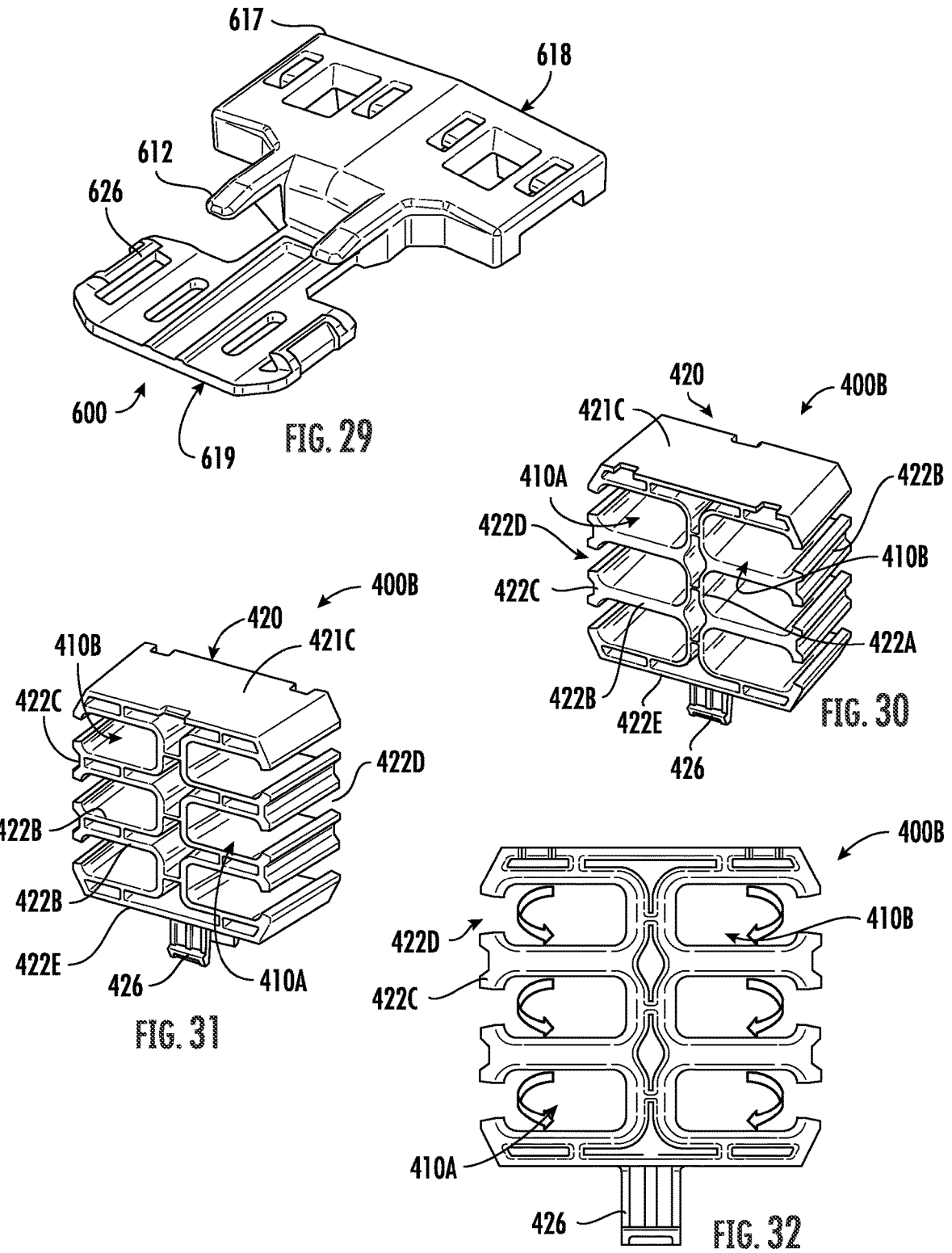
FIG. 29 is a perspective view of an adaptor plate in accordance with embodiments of the present disclosure.
FIG. 30 is a perspective view of a retainer clip in accordance with embodiments of the present disclosure.
FIG. 31 is a perspective view of a retainer clip in accordance with embodiments of the present disclosure.
FIG. 32 is a perspective view of a retainer clip in accordance with embodiments of the present disclosure.

Referring now to FIGS. 28A-28B and FIG. 29, an adaptor plate 600 may be attachable to the base wall 504. Embodiments of the retainer clip 400 are attachable to a platform wall 604 formed at the adaptor plate 600. The platform wall 604 may include a perimeter 618 and apertures 616 configured substantially similarly as the perimeter 518 and apertures 516 at the base wall 504. The adaptor plate 600 further includes a distal end 619 from the perimeter 618 along the longitudinal direction 401 at which the retainer clip 400 is attachable. The distal end 619 of the adaptor plate 600 forms an interface attachable to the perimeter 518 of the base wall 504. The distal end 619 of the adaptor plate 600 includes hooks, clips, or legs such as depicted and described regarding the retainer clip 400 to attach to the base wall 504. The adaptor plate 600 may particularly provide a surface extended along the longitudinal direction 102 from the base wall 504 at which the retainer clip 400 is positionable.

In certain embodiments, such as depicted in FIGS. 21-22 and FIGS. 36-37, the adaptor plate 600 allows a multi-tier retainer clip 400B to avoid contact with other components of the receptacle 500, such as the bracket assembly 140. Referring to FIGS. 30-34 and FIGS. 35A-35D, embodiments of multi-tiered retainer clip 400B are provided. Embodiments of the multi-tiered retainer clip 400B may be configured such as depicted and described regarding the single-tiered retainer clip 400A. FIG. 30 depicts an embodiment of the retainer clip 400B from a first perspective view. FIG. 31 depicts an embodiment of the retainer clip 400B from a second perspective view, such as from opposite along the longitudinal direction 401 as the first perspective view.

The multi-tiered retainer clip 400B includes body 420 forming pathway 410. Body 420 includes a plurality of pathway walls 422 forming a plurality of pathways 410, such as depicted at the columns of pathways 410A, 410B. The plurality of pathway walls 422 separate the plurality of pathways 410 from one another. The plurality of pathway walls 422 may include a substantially transverse wall 422A separating the pathways 410 into columns of pathways 410A, 410B. The plurality of pathway walls 422 may further include a substantially lateral wall 422B separating the pathways 410 into rows. Lateral wall 422B extends from transverse wall 422A.

The plurality of pathway walls 422 may further include an outer perimeter wall 422C extending along the transverse direction 403 from lateral ends of the lateral wall 422B. The outer perimeter wall 422C may be disconnected from adjacent walls 422C extended from adjacent lateral walls 422B, such as to form a gap 422D between adjacent walls 422C.

Pluralities of insert 430 are positionable into respective pathways 410A, 410B. The gap 422D between adjacent walls 422C may provide compliance or flexibility, such as described regarding ridges 427 at lid 428. The plurality of walls 422 such as described herein may further provide a spring structure, such as to allow for a desired balance between flexibility and stiffness of the retainer clip 400.

Figure 34:
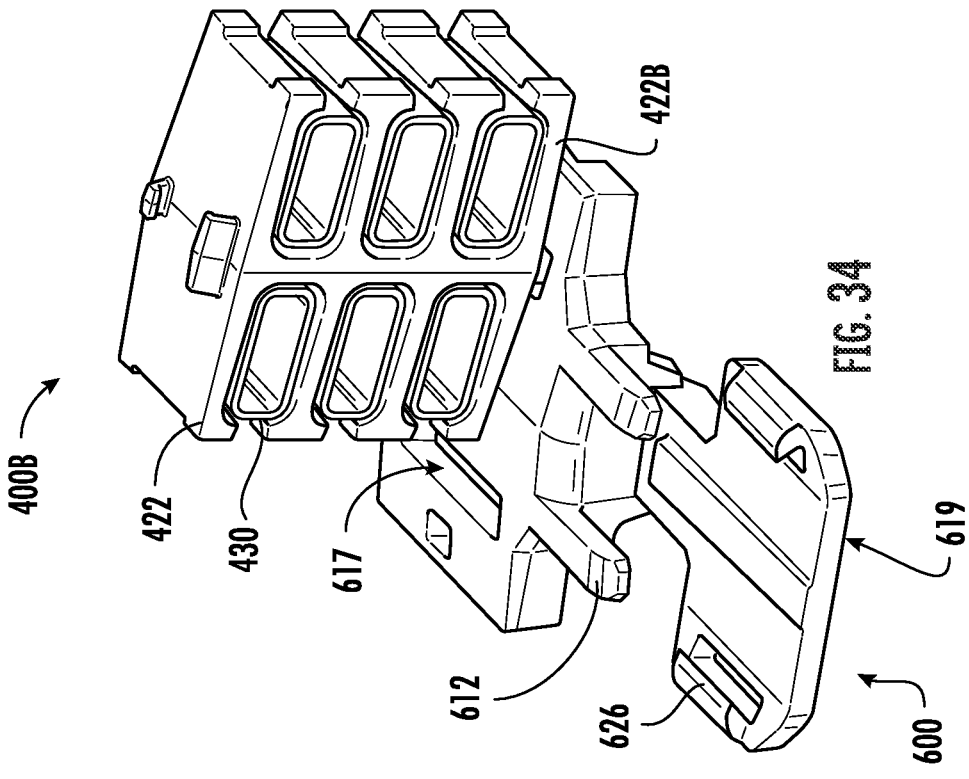
FIG. 34 is a perspective view of a retainer clip attached to an adaptor plate in accordance with embodiments of the present disclosure.
Figure 33:
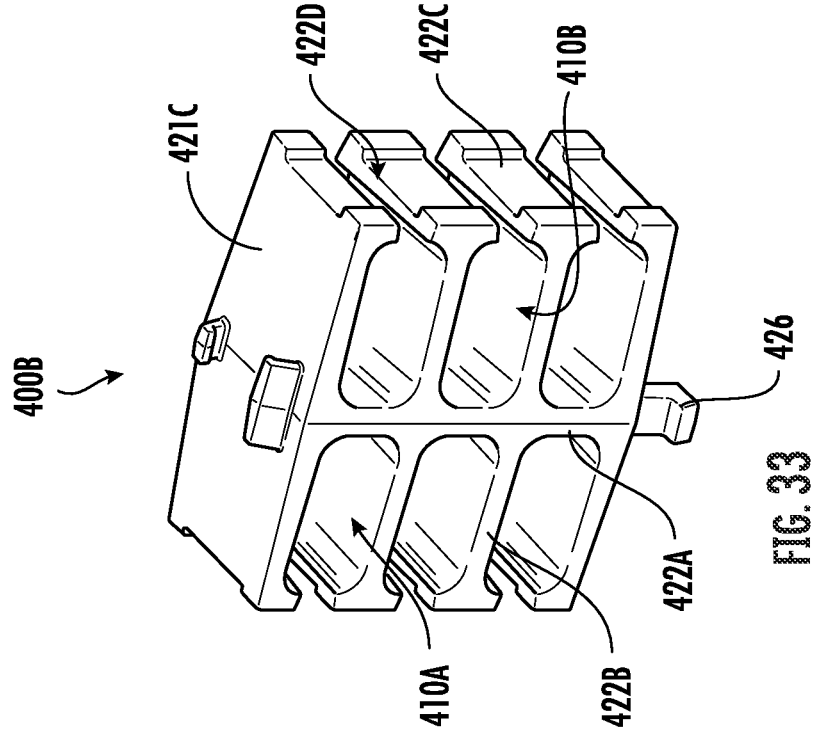
FIG. 33 is a perspective view of a retainer clip in accordance with embodiments of the present disclosure.
Figure 35A:
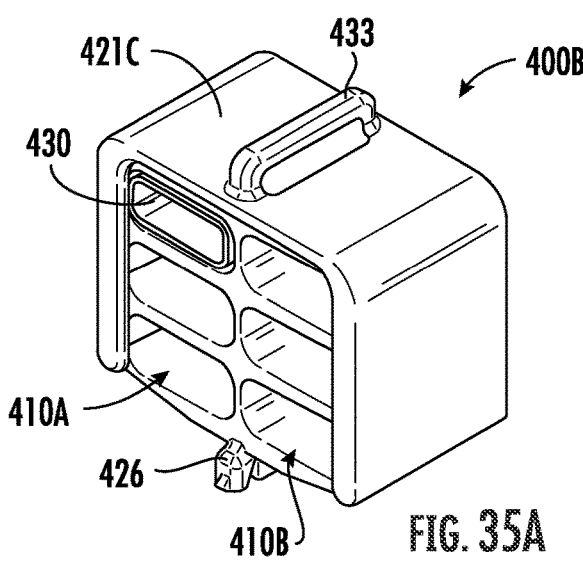
FIG. 35A is a perspective view of a retainer clip in accordance with embodiments of the present disclosure.
Figure 35B:
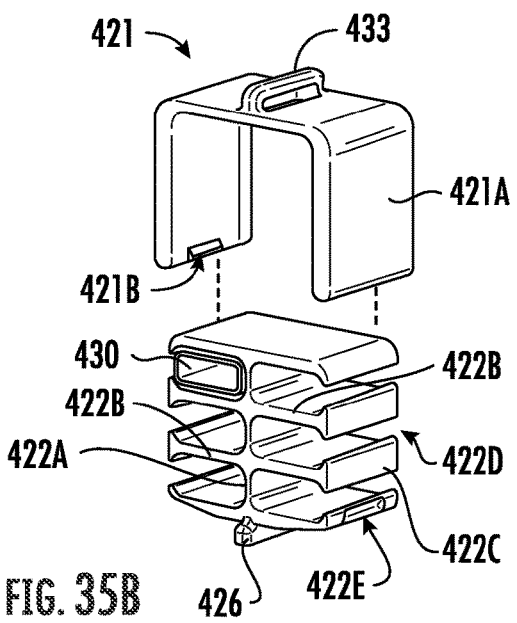
FIG. 35B is a perspective, exploded view of the retainer clip of FIG. 35A in accordance with embodiments of the present disclosure.
Figure 35C:
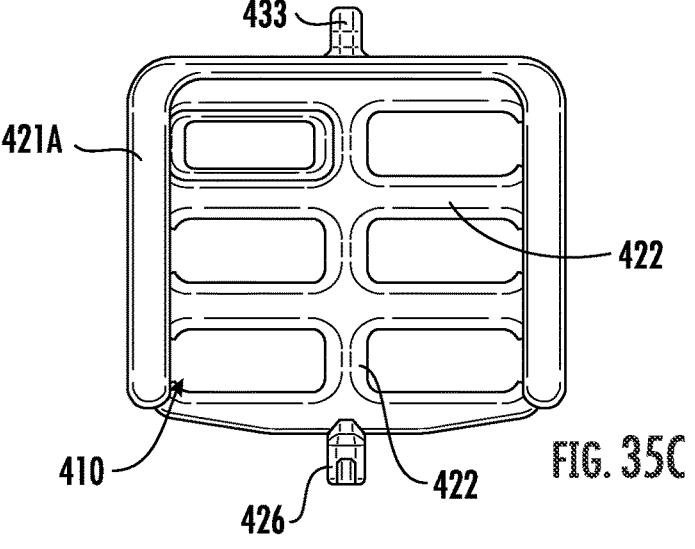
FIG. 35C is a view of the retainer clip of FIGS. 34A-34B in accordance with embodiments of the present disclosure.
Figure 35D:
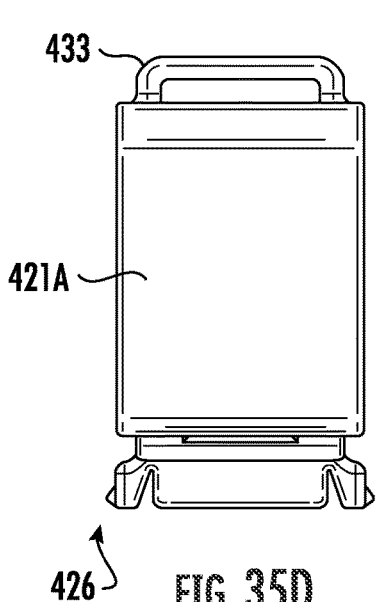
FIG. 35D is a side-view of the retainer clip of FIGS. 34A-34C in accordance with embodiments of the present disclosure.

Legs 426 at multi-tiered retainer clip 400B may particularly include trigger snaps, hooks, or clips. Legs 426 at retainer clip 400B are configured to snap, press-fit, interference fit, or otherwise connect into slotted aperture 517 at base wall 504 or slotted aperture 617 at adaptor plate 600, such as depicted at FIG. 29 and FIG. 34.

Figure 21:
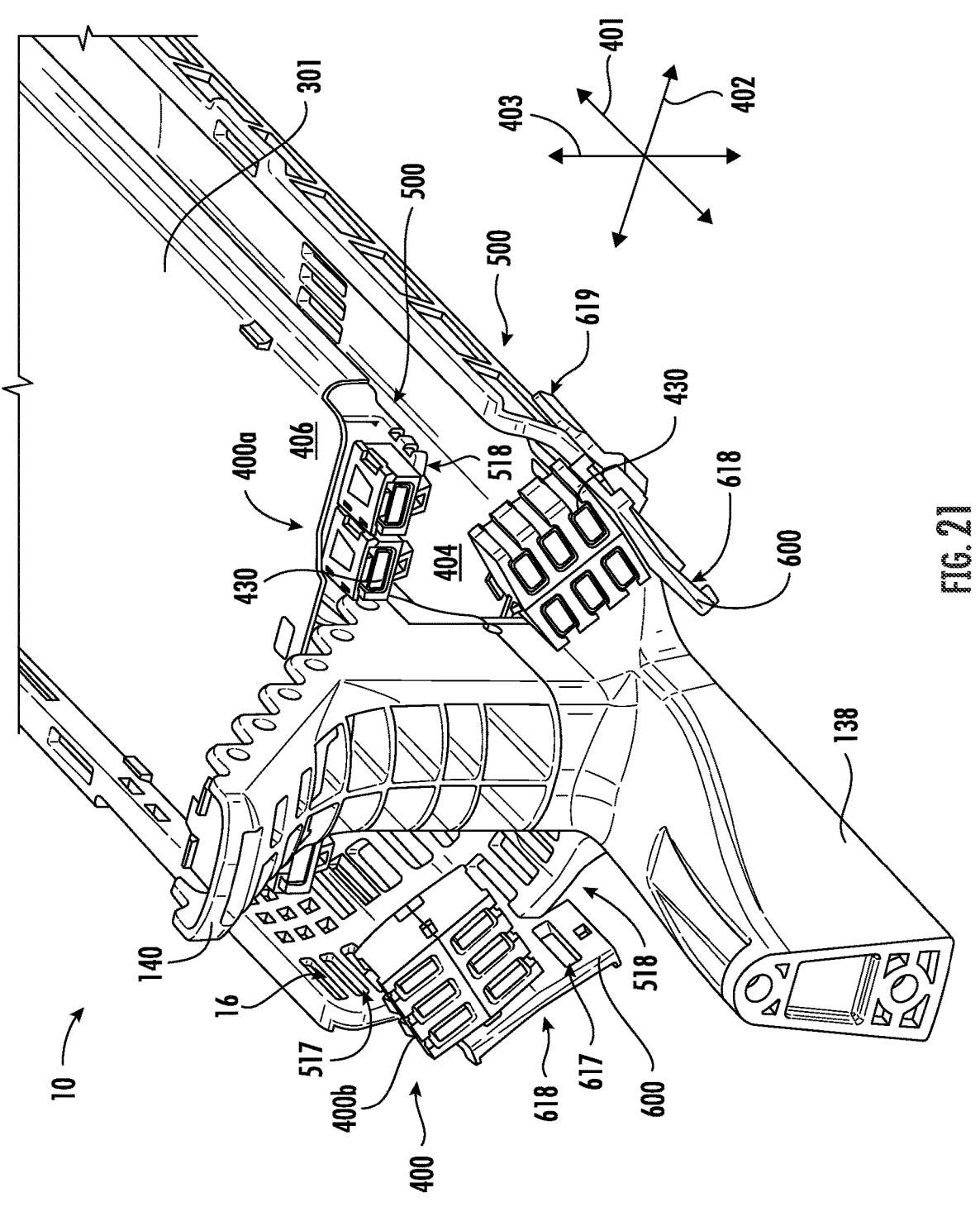
FIG. 21 is a perspective view of a receptacle including embodiments of a retainer clip attached thereto in accordance with embodiments of the present disclosure.
Figure 22:
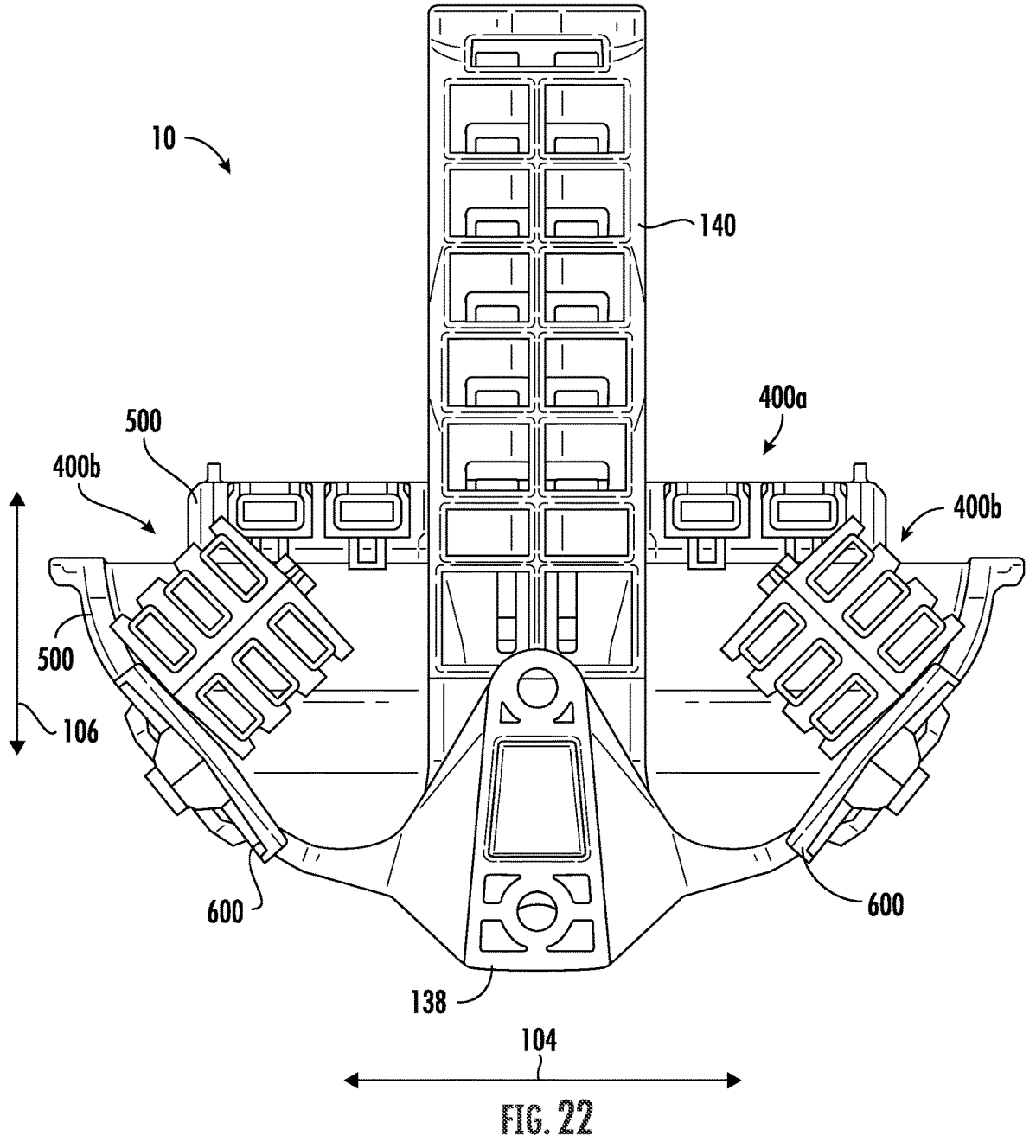
FIG. 22 is a view of the receptacle of FIG. 21 including embodiments of a retainer clip attached thereto in accordance with embodiments of the present disclosure.
Figure 23:
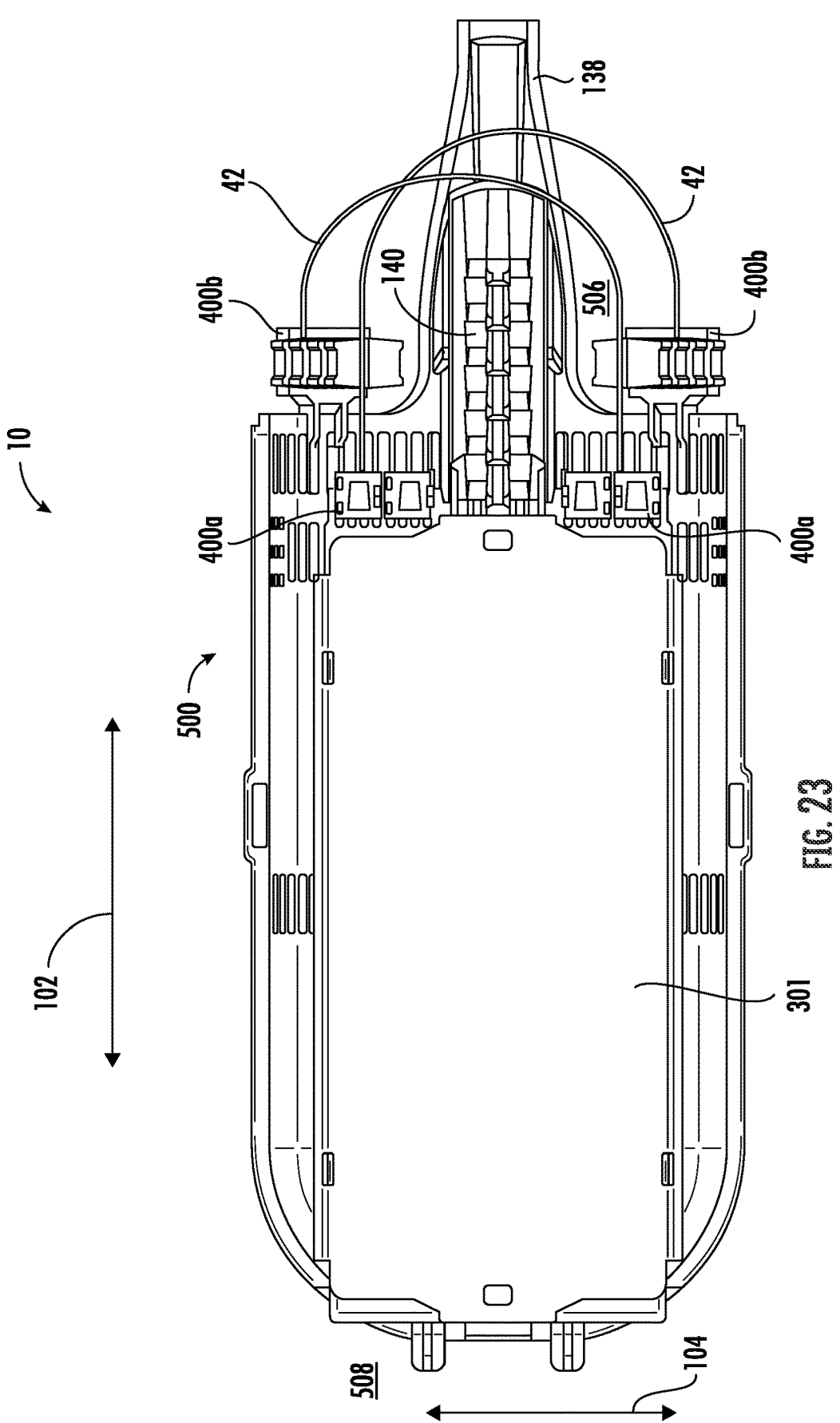
FIG. 23 is a top-down view of the receptacle of FIG. 21 in accordance with embodiments of the present disclosure.
Figure 24:
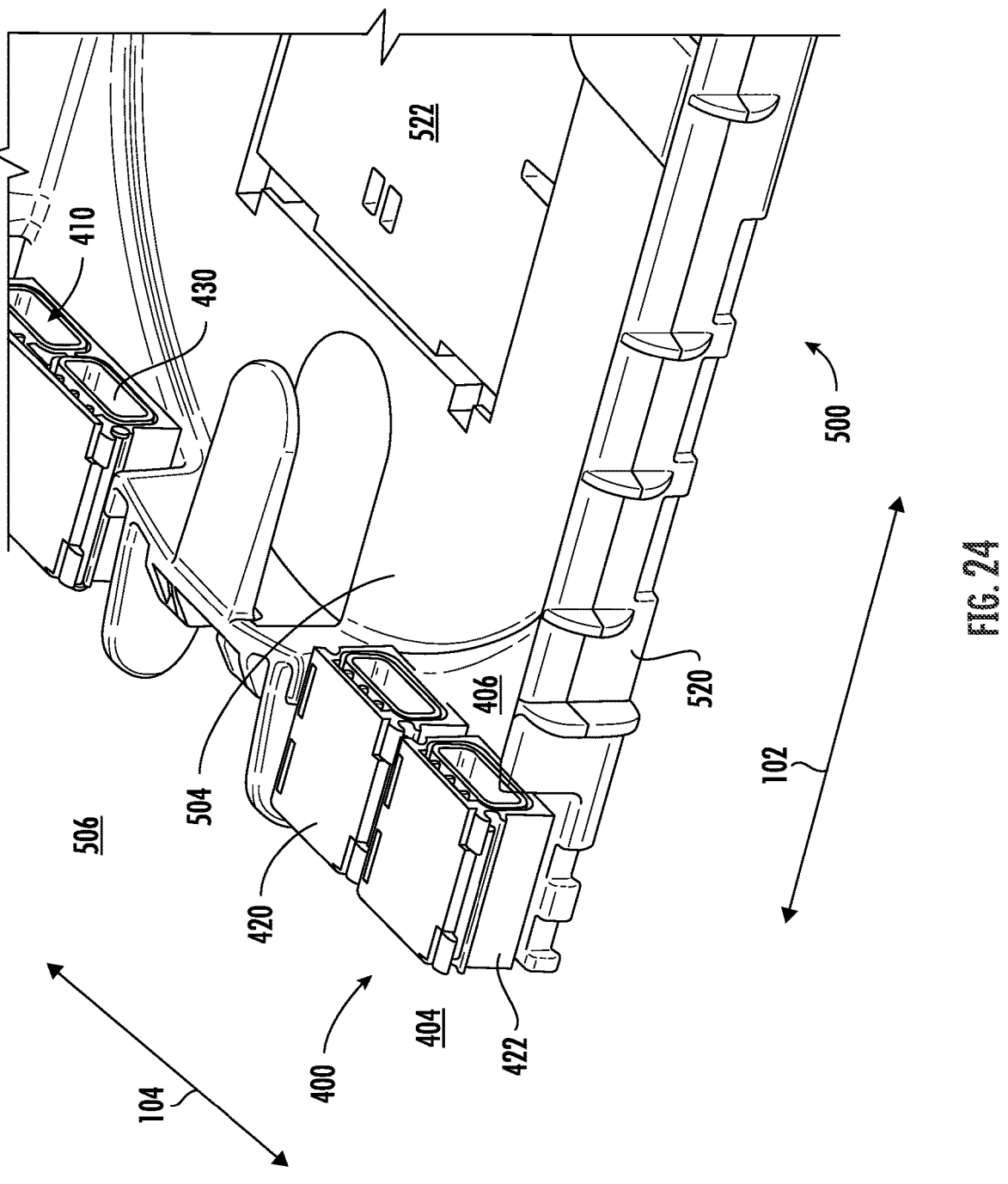
FIG. 24 is a perspective view of a receptacle including the retainer clip attached thereto in accordance with embodiments of the present disclosure.

In the embodiment depicted in FIG. 32, the exemplary embodiment of the multi-tier retainer clip 400B includes the pathways 410A, 410B positioned at an oblique angle relative to the longitudinal axis. In certain embodiments, the pathways 410A, 410B converge toward the transverse wall 422A. In other embodiments, pathways 410A, 410B diverge away from the transverse wall 422A. It should be appreciated that the plurality of pathways 410 may include converging and diverging pathways Referring to FIG. 34, an exemplary embodiment of multi-tiered retainer clip 400B positioned at adaptor plate 600 is provided. Retainer clip 400B is positioned within slotted aperture 617. Distal end 619 includes trigger snaps 626 configured to latch through slotted aperture 517 at base wall 504 (FIG. 21). Middle portion 621 include clips 612 configured to latch onto perimeter 518 of base wall 504. Clip 612 may be configured substantially similarly as clip 412 at retainer clip 400A.

Referring to FIGS. 35A-35D, in certain embodiments, multi-tiered clip 400 includes a retainer cover 421 releasably positionable around lateral ends of the plurality of walls 422. Retainer cover 421 may include a transverse cover wall 421A extending alongside the lateral ends of lateral wall 422B. Retainer cover 421 may particularly enclose or cover the gap 422D between adjacent walls 422C, such as to inhibit fluid communication through gap 422D. Retainer cover 421 may include a clip, trigger snap, hook, or other connection feature 421B positioned at the transverse cover wall 421A to connect to the lateral end of lateral wall 422B, or particularly a lower-most lateral wall 422E along the transverse direction 403.

In certain embodiments, the retainer cover 421 may include bridge 433 at an upper lateral wall 421C from which transverse cover wall 421A extends. Bridge 433 includes an opening under which a strap, tie strap, or flexible band may extend.

Figure 36:
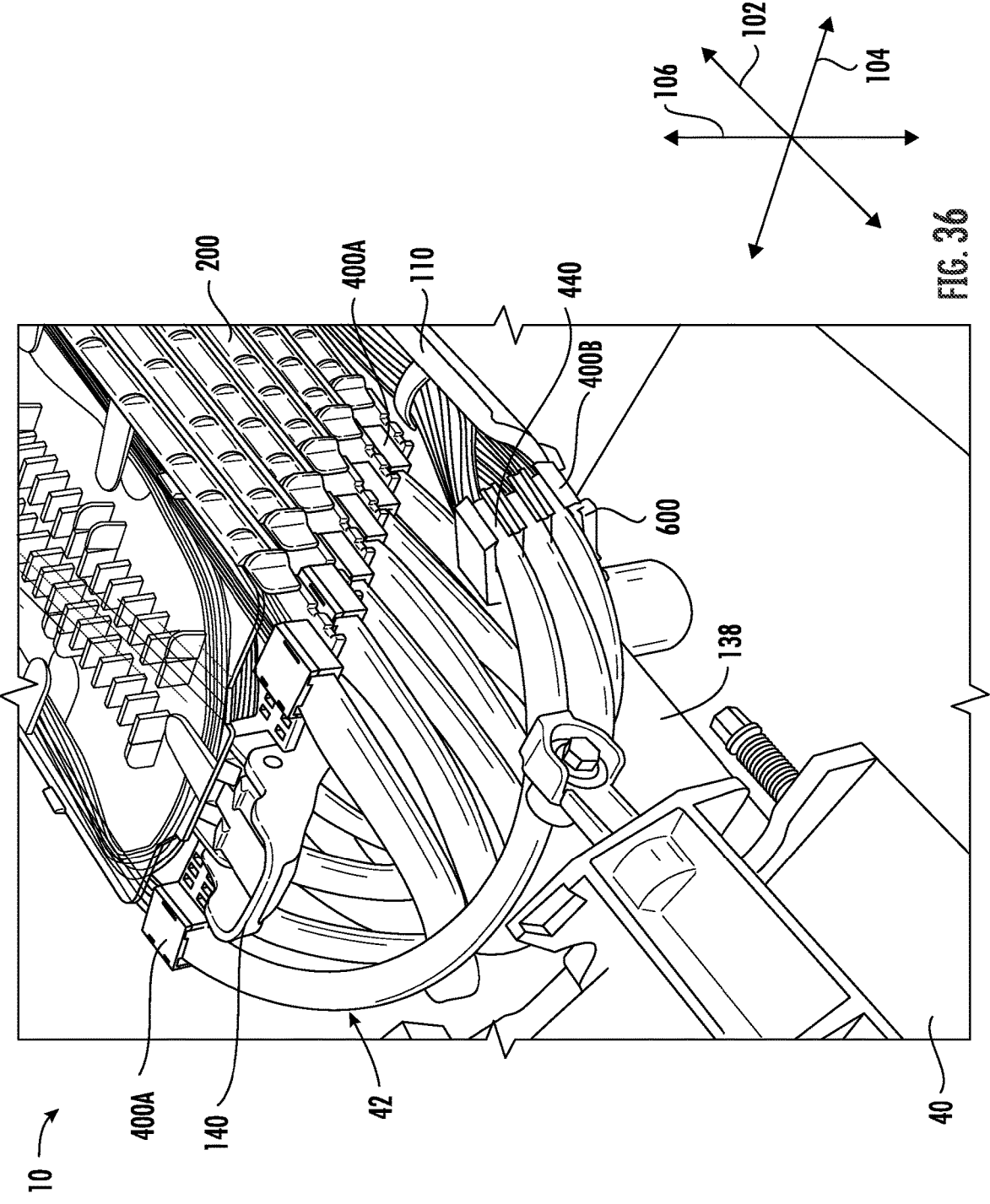
FIG. 36 is a perspective view of a housing in accordance with embodiments of the present disclosure.
Figure 37:
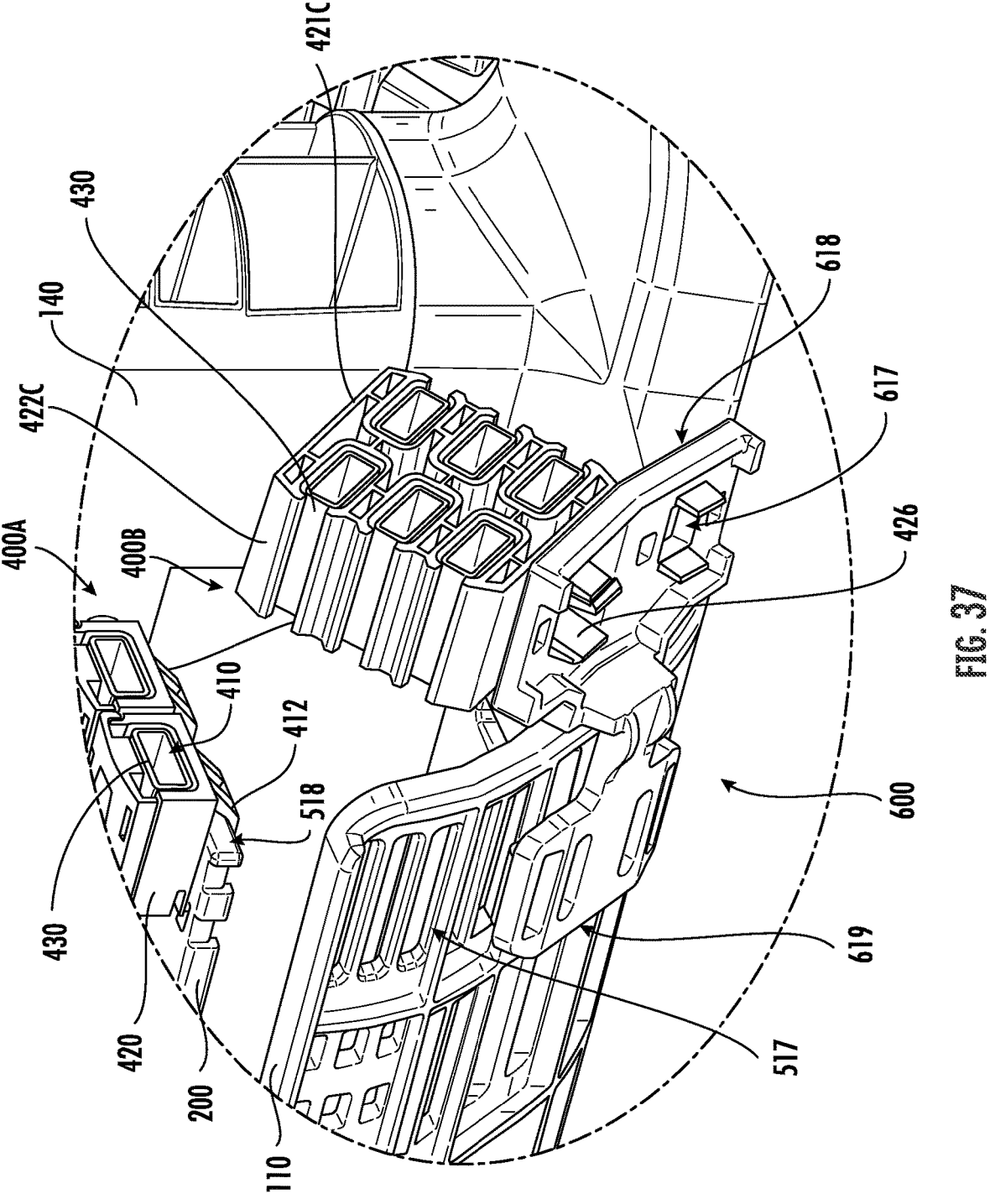
FIG. 37 is a perspective view of a portion of the housing in accordance with embodiments of the present disclosure.

Referring now to FIGS. 36-37, a perspective view of an exemplary embodiment of housing 10 in accordance with aspects of the present disclosure is provided. Housing 10 forms a closure through which cable 42 is extended and secured in position by single-tier retainer clip 400A and multi-tier retainer clip 400B such as provided herein. Flexible liner 440 surrounds the cable 42 outside of the housing 10. In the embodiment depicted, flexible liner 440 is extended from and to respective second clip ends of the retainer clips 400. However, it should be appreciated that the flexible liner 440 may extend from second clip end to first clip end of the respective retainer clip, such as to at least surround the portion of the cable 42 extended through the retainer clip 400. Retainer clips 400A are attached to receptacles forming trays 200, such as depicted and described herein. However, in other embodiments, retainer clips 400A are additionally, or alternatively, attached to deep trays 300. Retainer clips 400B are attached to basket 110. However, in other embodiments, retainer clips 400B are additionally, or alternatively, attached to secondary basket 150. Adaptor plate 600 is attached to and extends along the longitudinal direction 102 from basket 110, such as to provide desired organization, strain relief, and mitigatory features while furthermore avoiding trays 200 along the transverse direction 106.

An exemplary embodiment of the housing 10 includes one or more retainer clips 400 having insert 430 positioned at the pathway 410 formed in the retainer clip 400. Flexible liner 440, 441 is wrapped or sleeved around insert 430, allowing the flexible liner 440, 441 to be positioned between outer portions of insert walls 432 of insert 430 and inner portions of body 420, or particularly pathway walls 422, of retainer clip 400. One or more splice trays 200, 300 each have four (4) or fewer single-tier retainer clips 400A. In one embodiment, each single-tier retainer clip 400A has 576-count 250 micrometer (μm) fibers extended through each insert 430 of the single-tier retainer clip 400A. In another embodiment, each single-tier retainer clip 400A has 864-count 200 μm fibers extended through each insert 430 of the single-tier retainer clip 400A. Basket 110 has two (2) or fewer multi-tier retainer clips 400B. Each multi-tier retainer clip 400B is coupled to respective adaptor plates 600 attached to perimeter 518 of basket 110. Each multi-tier retainer clip 400B has six (6) or fewer inserts 430 extended through respective pathways 410. Each multi-tier retainer clip 400B has up to 3456-count 250 μm fibers extended therethrough. Each multi-tier retainer clip 400B has up to 5184-count 200 μm fibers extended therethrough. Embodiments of the structures provided herein allow for protection, damage mitigation, fluid isolation, and organization of bare fibers entering into and egressing from the receptacle 500 through the retainer clip 400. Structures provided herein allow for reduced preparation time, improved aesthetics and organization, and re-enterability and re-useability of components such as retainer clips 400, inserts 430, liners 440. Structures provided herein may be utilized with one or more various type of cables, fibers, or other conduits for fiber optic housings.

Figures 38, 39:
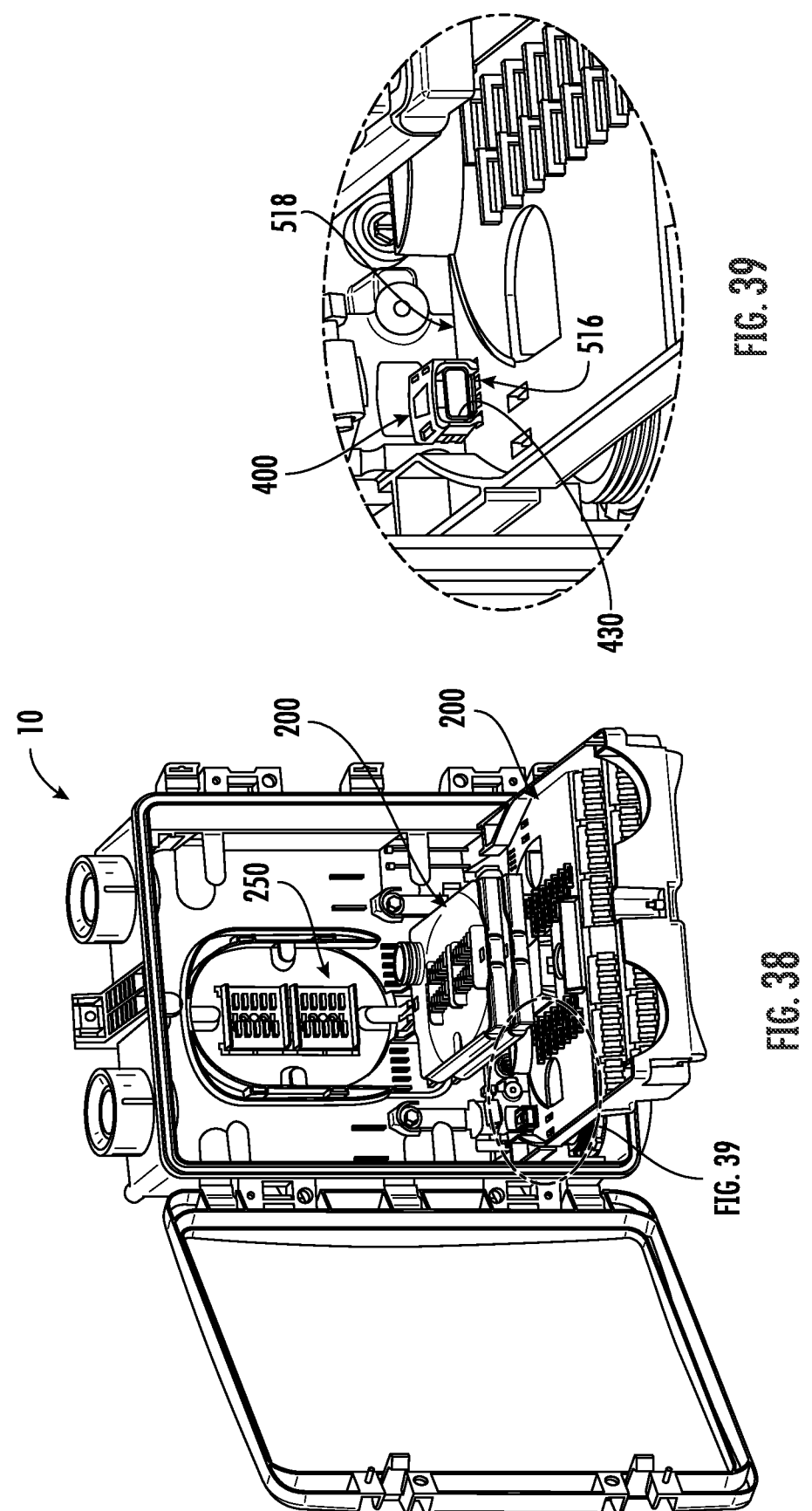
FIG. 38 is a perspective view of a housing in accordance with embodiments of the present disclosure.
FIG. 39 is a perspective view of a portion of the housing of FIG. 38 in accordance with embodiments of the present disclosure.

Referring now to FIGS. 38-39, a perspective view of an exemplary embodiment of housing 10 in accordance with aspects of the present disclosure is provided. FIG. 39 is a close-up view of a portion of the housing 10 in FIG. 38.

Housing 10 forms an enclosure through which cable 42 is extendable and secured in position by one or more embodiments of clip 400 such as described herein. In FIGS. 38-39, the single-tier retainer clip 400A is depicted attached to perimeter 518 of an attaching structure. However, it should be appreciated that other embodiments may include the multi-tier retainer clip 400B attached to the perimeter 518. Housing 10 includes tray 200 and splice module 250 such as depicted and described herein. Embodiments depicted in FIGS. 38-39 may be configured such as described in regard to FIGS. 36-37. However, it should be appreciated that any appropriate quantity or type of fibers may be utilized.

Further aspects of the invention are provided by one or more of the following embodiments:

1. A fiber optic housing, the housing including a receptacle including a plurality of sidewalls extending along a longitudinal axis between a first end and a second end, wherein the first end forms an open end such that a cable is extendable to or from an interior of the receptacle; a base wall extending from the plurality of sidewalls along the longitudinal axis and a lateral axis, wherein the base wall forms a plurality of apertures at the first end; an end wall extending along the lateral axis between the plurality of sidewalls, wherein the receptacle forms the interior between the plurality of sidewalls, the base wall, and the end wall; a retainer clip fixable to the receptacle at one or more of the plurality of apertures, the retainer clip forming a pathway extending along the longitudinal axis between a first clip end and a second clip end, wherein the first clip end and the second clip end form openings into the pathway, wherein the cable is extendable into the receptacle through the pathway.

2. The fiber optic housing of any one or more clauses herein, the retainer clip including a body forming the pathway extending therethrough between the first clip end and the second clip end.

3. The fiber optic housing of any one or more clauses herein, wherein the body includes a plurality of pathway walls substantially forming the pathway.

4. The fiber optic housing of any one or more clauses herein, wherein the body includes a hinge, and wherein at least one of the plurality of pathway walls is moveable along the hinge to provide an open face to the pathway.

5. The fiber optic housing of any one or more clauses herein, including a removeable insert positionable through the pathway at the retainer clip, the insert including a plurality of insert walls extending along the longitudinal direction, wherein the insert forms a slot within the insert, the slot extending substantially co-directional to the pathway between a first insert opening and a second insert opening.

6. The fiber optic housing of any one or more clauses herein, wherein the insert includes a separation wall extending along the longitudinal direction between the plurality of insert walls to form a plurality of slots.

7. The fiber optic housing of any one or more clauses herein, the insert including a first material, wherein the first material is an elastic material.

8. The fiber optic housing of any one or more clauses herein, the retainer clip including a second material, wherein the second material is a thermoplastic material.

9. The fiber optic housing of any one or more clauses herein, wherein the slot is convergent along the longitudinal direction from the first insert opening toward the second insert opening.

10. The fiber optic housing of any one or more clauses herein, the retainer clip including a stop wall extending along a transverse direction from the first clip end toward the insert, wherein the stop wall is configured to inhibit movement of the insert along the longitudinal direction toward the first clip end.

11. The fiber optic housing of any one or more clauses herein, wherein the pathway is convergent along the longitudinal direction from the first clip end toward the second clip end.

12. The fiber optic housing of any one or more clauses herein, the retainer clip including legs extending along a transverse direction, wherein the legs are positionable through the plurality of apertures at the base wall.

13. The fiber optic housing of any one or more clauses herein, the retainer clip including a body forming the pathway, wherein the body includes a plurality of pathway walls forming a plurality of pathways, and wherein the plurality of pathway walls separate the plurality of pathways from one another, forming the pathway extending therethrough between the first clip end and the second clip end.

14. The fiber optic housing of any one or more clauses herein, the retainer clip including a clip attachable to a perimeter of the base wall.

15. A fiber optic housing, the housing including a base insertable at least partially into the interior of the housing; a basket extending along a longitudinal axis between a first end and a second end, wherein the first end forms an open end such that one or more cables extends into the interior of the housing along the longitudinal axis, and the second end forms a closed end; a bracket assembly extending along a transverse axis from the basket, the bracket assembly including a plurality of hinge assemblies along the transverse axis; a fiber optic organizing system rotatably and removably connectable to the bracket assembly between the hinge assemblies, the organizing system extending along the longitudinal axis between the first end and the second end and extending along a lateral axis between a first sidewall and a second sidewall, the organizing system including a base wall extending along the longitudinal axis and the lateral axis, the base wall forming a plurality of apertures, wherein an interior is formed between the first sidewall, the second sidewall, and the base wall; a connector shaft extending from the first end along the longitudinal axis, the connector shaft connecting the organizing system and the base together; and a retainer clip fixable to the fiber optic organizing system at the plurality of apertures, the retainer clip forming a pathway extending along the longitudinal axis between a first clip end and a second clip end, wherein the first clip end and the second clip end form openings into the pathway, wherein the cable is extendable into the organizing system through the pathway.

16. The fiber optic housing of any one or more clauses herein, including a removeable insert positionable through the pathway at the retainer clip, the insert including a plurality of insert walls extending along the longitudinal direction, wherein the insert forms a slot within the insert, the slot extending substantially co-directional to the pathway between a first insert opening and a second insert opening.

17. The fiber optic housing of any one or more clauses herein, wherein the insert includes a separation wall extending along the longitudinal direction between the plurality of insert walls to form a plurality of slots.

18. The fiber optic housing of any one or more clauses herein, the insert including an isoprene, a Styrene-butadiene rubber, a butyl rubber, a nitrile rubber, an ethylene propylene diene monomer rubber, a silicone, a polyurethane, a hydrogenated nitrile rubber, a fluoroelastomer material, or combination thereof.

19. The fiber optic housing of any one or more clauses herein, the retainer clip including a thermoplastic polymer.

20. The fiber optic housing of any one or more clauses herein, wherein the slot is convergent along the longitudinal direction from the first insert opening toward the second insert opening.

21. The fiber optic housing of any one or more clauses herein, wherein the housing is a closure.

22. The fiber optic housing of any one or more clauses herein, wherein the housing is a butt closure or a domed closure.

23. The fiber optic housing of any one or more clauses herein, wherein the housing is an enclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fiber optic housing, the housing comprising:
   a receptacle comprising;
      a plurality of sidewalls extending along a longitudinal axis between a first end and a second end, wherein the first end forms an open end such that a cable is extendable to or from an interior of the receptacle;
      a base wall extending from the plurality of sidewalls along the longitudinal axis and a lateral axis, wherein the base wall forms a plurality of apertures at the first end;
      an end wall extending along the lateral axis between the plurality of sidewalls, wherein the receptacle forms the interior between the plurality of sidewalls, the base wall, and the end wall;
   an adaptor plate comprising a snap attachable into one or more of the apertures of the base wall of the receptacle, the adaptor plate comprising a platform wall comprising an aperture, the adaptor plate comprising a clip positioned along a middle portion along the longitudinal axis along which the adaptor plate extends from the aperture of the base wall of the receptacle, the clip configured to extend over a perimeter of the base wall to affix the adaptor plate to the base wall of the receptacle; and
   a retainer clip comprising a leg extendable into the aperture at the platform wall of the adaptor plate to affix the retainer clip to the adaptor plate, the retainer clip forming a pathway extending along the longitudinal axis between a first clip end and a second clip end, wherein the first clip end and the second clip end form openings into the pathway, wherein the cable is extendable into the receptacle through the pathway.

2. The fiber optic housing of claim 1, the retainer clip comprising a body forming the pathway extending therethrough between the first clip end and the second clip end, wherein the body comprises a plurality of pathway walls substantially forming the pathway.

3. The fiber optic housing of claim 2, wherein the body comprises a hinge, and wherein at least one of the plurality of pathway walls is moveable along the hinge to provide an open face to the pathway.

4. The fiber optic housing of claim 1, comprising:
   a removeable insert positionable through the pathway at the retainer clip, the insert comprising a plurality of insert walls extending along the longitudinal direction, wherein the insert forms a slot within the insert, the slot extending substantially co-directional to the pathway between a first insert opening and a second insert opening.

5. The fiber optic housing of claim 4, wherein the insert comprises a separation wall extending along the longitudinal direction between the plurality of insert walls to form a plurality of slots.

6. The fiber optic housing of claim 4, the insert comprising a first material comprising an elastic material, and wherein the retainer clip comprises a second material comprising a thermoplastic material.

7. The fiber optic housing of claim 4, wherein the slot is convergent along the longitudinal direction from the first insert opening toward the second insert opening.

8. The fiber optic housing of claim 7, the retainer clip comprising a stop wall extending along a transverse direction from the first clip end toward the insert, wherein the stop wall is configured to inhibit movement of the insert along the longitudinal direction toward the first clip end.

9. The fiber optic housing of claim 1, wherein the pathway is convergent along the longitudinal direction from the first clip end toward the second clip end.

10. The fiber optic housing of claim 1, the retainer clip comprising a clip attachable to a over the perimeter of the adaptor plate.

11. A fiber optic housing, the housing comprising:
   a base insertable at least partially into the interior of the housing;
   a basket extending along a longitudinal axis between a first end and a second end, wherein the first end forms an open end such that one or more cables extends into the interior of the housing along the longitudinal axis, and the second end forms a closed end;
   a bracket assembly extending along a transverse axis from the basket, the bracket assembly comprising a plurality of hinge assemblies along the transverse axis;
   a fiber optic organizing system rotatably and removably connectable to the bracket assembly between the hinge assemblies, the organizing system extending along the longitudinal axis between the first end and the second end and extending along a lateral axis between a first sidewall and a second sidewall, the organizing system comprising a base wall extending along the longitudinal axis and the lateral axis, the base wall forming a plurality of apertures, wherein an interior is formed between the first sidewall, the second sidewall, and the base wall;
   a connector shaft extending from the first end along the longitudinal axis, the connector shaft connecting the organizing system and the base together; and
   a retainer clip comprising a leg extendable into one or more of the plurality of apertures at the base wall of the fiber optic organizing system, the retainer clip comprising a clip attachable over a perimeter of the base wall of the fiber optic organizing system to affix the retainer clip to the fiber optic organizing system, the retainer clip forming a pathway extending along the longitudinal axis between a first clip end and a second clip end, wherein the first clip end and the second clip end form openings into the pathway, wherein the cable is extendable into the organizing system through the pathway.

12. The fiber optic housing of claim 11, comprising:

a removeable insert positionable through the pathway at the retainer clip, the insert comprising a plurality of insert walls extending along the longitudinal direction, wherein the insert forms a slot within the insert, the slot extending substantially co-directional to the pathway between a first insert opening and a second insert opening.

13. The fiber optic housing of claim 12, wherein the insert comprises a separation wall extending along the longitudinal direction between the plurality of insert walls to form a plurality of slots.

14. The fiber optic housing of claim 12, the insert comprising an isoprene, a Styrene-butadiene rubber, a butyl rubber, a nitrile rubber, an ethylene propylene diene monomer rubber, a silicone, a polyurethane, a hydrogenated nitrile rubber, a fluoroelastomer material, or combination thereof, and the retainer clip comprising a thermoplastic polymer.

15. The fiber optic housing of claim 11, comprising:

an adaptor plate comprising a snap attachable into one or more of the apertures of the base wall of the fiber optic organizing system, the adaptor plate comprising a platform wall comprising an aperture, the adaptor plate comprising a clip positioned along a middle portion along the longitudinal axis along which the adaptor plate extends from the aperture of the base wall of the receptacle.

16. The fiber optic housing of claim 15, wherein the clip of the adaptor plate is configured to extend over the perimeter of the base wall to affix the adaptor plate to the base wall of the receptacle.

17. The fiber optic housing of claim 11, the retainer clip comprising a body forming the pathway extending therethrough between the first clip end and the second clip end, wherein the body comprises a plurality of pathway walls substantially forming the pathway.

18. The fiber optic housing of claim 17, wherein the plurality of pathway walls form a plurality of pathways in vertical arrangement and separated from one another by a lateral wall extending from a transverse wall and separating the plurality of pathways into rows.

19. The fiber optic housing of claim 18, wherein the plurality of pathway walls forms a gap between adjacent lateral walls and permitting egress along a lateral direction to a respective pathway of the plurality of pathways.

20. The fiber optic housing of claim 19, the retainer clip comprising a retainer cover releasably positionable around lateral ends of the plurality of pathway walls, the retainer cover comprising a transverse cover wall extending alongside lateral ends of the lateral wall of the plurality of pathway walls to obscure the gap along the lateral direction to the respective pathway of the plurality of pathways.

* * * * *